(12) United States Patent
Takahashi et al.

(10) Patent No.: US 6,292,513 B1
(45) Date of Patent: *Sep. 18, 2001

(54) IMAGE SIGNAL CONVERSION APPARATUS AND METHOD

(75) Inventors: Jun Takahashi, Katano; Shinya Kadono, Kobe; Choong Seng Boon, Moriguchi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,867

(22) Filed: Mar. 29, 2000

Related U.S. Application Data

(62) Division of application No. 08/818,662, filed on Mar. 14, 1997, now Pat. No. 6,067,320.

(30) Foreign Application Priority Data

Mar. 15, 1996 (JP) ...................................... 8-59024

(51) Int. Cl.⁷ ...................................... H04B 1/66
(52) U.S. Cl. ...................................... 375/240.21
(58) Field of Search ...................... 375/240, 240.09, 375/240.17, 240.12, 240.21; 348/416.1, 441, 445, 455, 458, 459, 454, 392.1, 405.1, 396.1, 391.1, 678, 427.1, 401.1; 382/268, 243; 358/458, 455, 433

(56) References Cited

U.S. PATENT DOCUMENTS

| | | |
|---|---|---|
| 4,654,484 | 3/1987 | Reiffel et al. . |
| 4,672,444 | 6/1987 | Bergen et al. . |
| 4,816,901 * | 3/1989 | Music et al. ........................ 348/391 |
| 4,870,497 | 9/1989 | Chamzas et al. . |
| 4,914,508 * | 4/1990 | Music et al. ........................ 348/391 |
| 5,126,843 * | 6/1992 | Tanaka ................................ 348/427 |
| 5,274,471 * | 12/1993 | Kim .................................... 358/455 |
| 5,282,063 * | 1/1994 | Deacon et al. ..................... 348/678 |
| 5,363,213 | 11/1994 | Coward et al. . |
| 5,387,938 | 2/1995 | Fukuda et al. . |
| 5,414,527 * | 5/1995 | Koshi et al. ........................ 358/433 |
| 5,418,626 | 5/1995 | Semasa . |
| 5,424,854 | 6/1995 | Hashimoto . |
| 5,426,513 | 6/1995 | Scorse et al. . |
| 5,644,406 | 7/1997 | Harrington et al. . |
| 5,696,845 | 12/1997 | Loce et al. . |
| 5,712,799 * | 1/1998 | Farmwald et al. .................. 345/475 |
| 5,760,921 * | 6/1998 | Miyake .............................. 358/458 |
| 5,973,740 * | 10/1999 | Hrusecky ........................... 348/401 |
| 6,067,320 * | 5/2000 | Takahashi et al. ............. 375/240.12 |

* cited by examiner

*Primary Examiner*—Chris Kelley
*Assistant Examiner*—Gims Philippe
(74) *Attorney, Agent, or Firm*—Wenderoth, Lind & Ponack, L.L.P.

(57) ABSTRACT

An image signal expressing pel values and a significance signal, declaring for each pel whether the pel value is significant, are supplied as input signals. By referring to the input significance signal values for the pels proximal to the pel being processed, the significant pels are identified and a resolution conversion characteristics selector selects one of two or more frequency conversion characteristics to be used for resolution conversion of the image signal using only significant pels. A resolution converter then converts the resolution of the input image signal using the selected resolution conversion characteristic, and outputs the result as the image conversion apparatus output signal. Resolution conversion of the input image signal can therefore be accomplished by means of pel subsampling or interpolation without being affected by nonsignificant pels, and resolution conversion with minimal image quality loss caused by the conversion process is achieved.

15 Claims, 18 Drawing Sheets

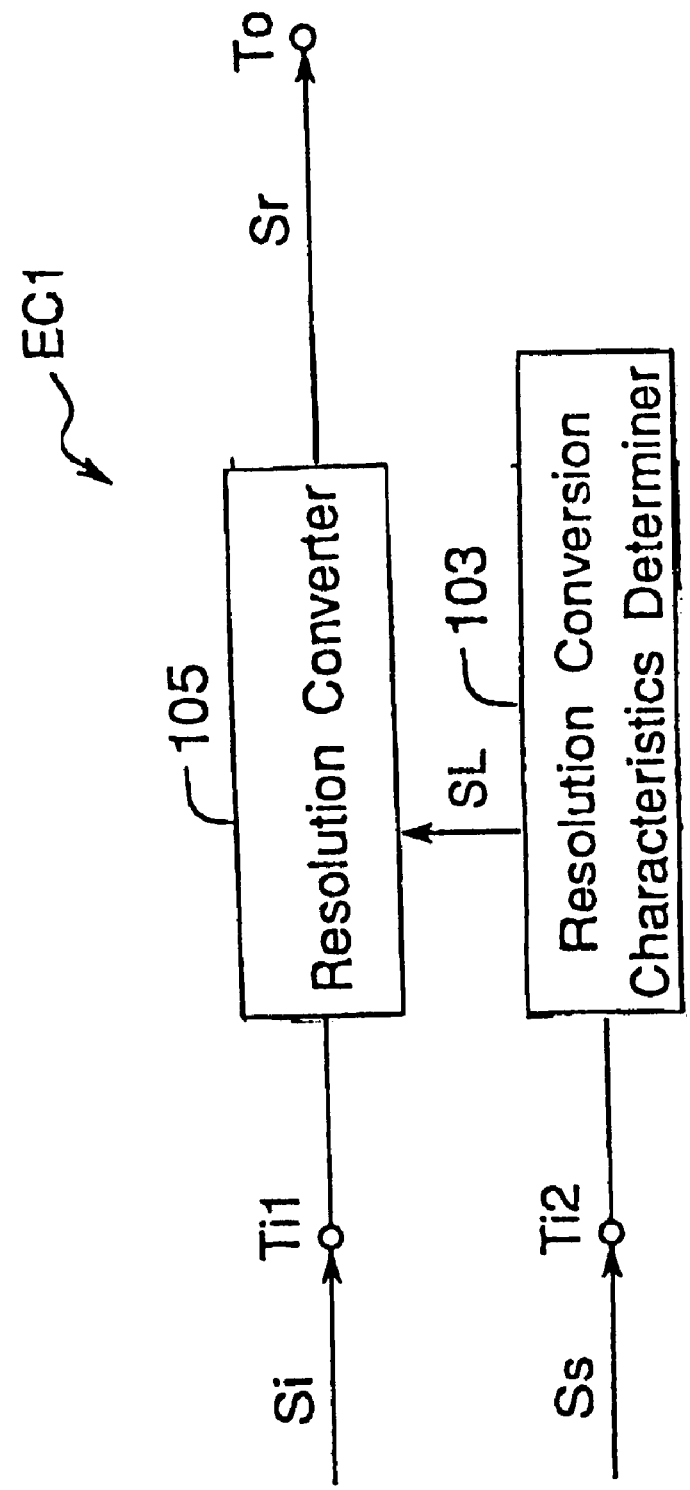

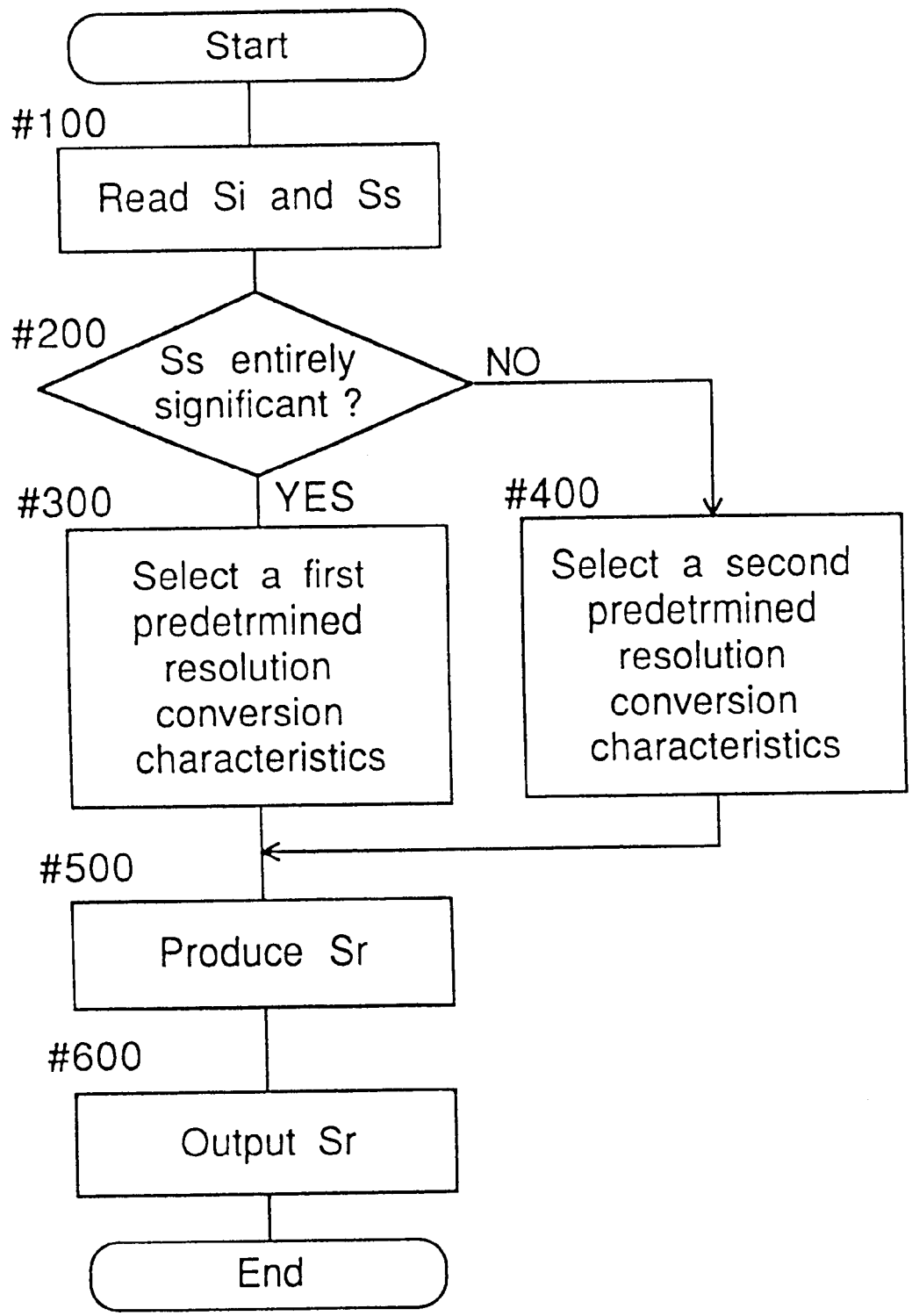

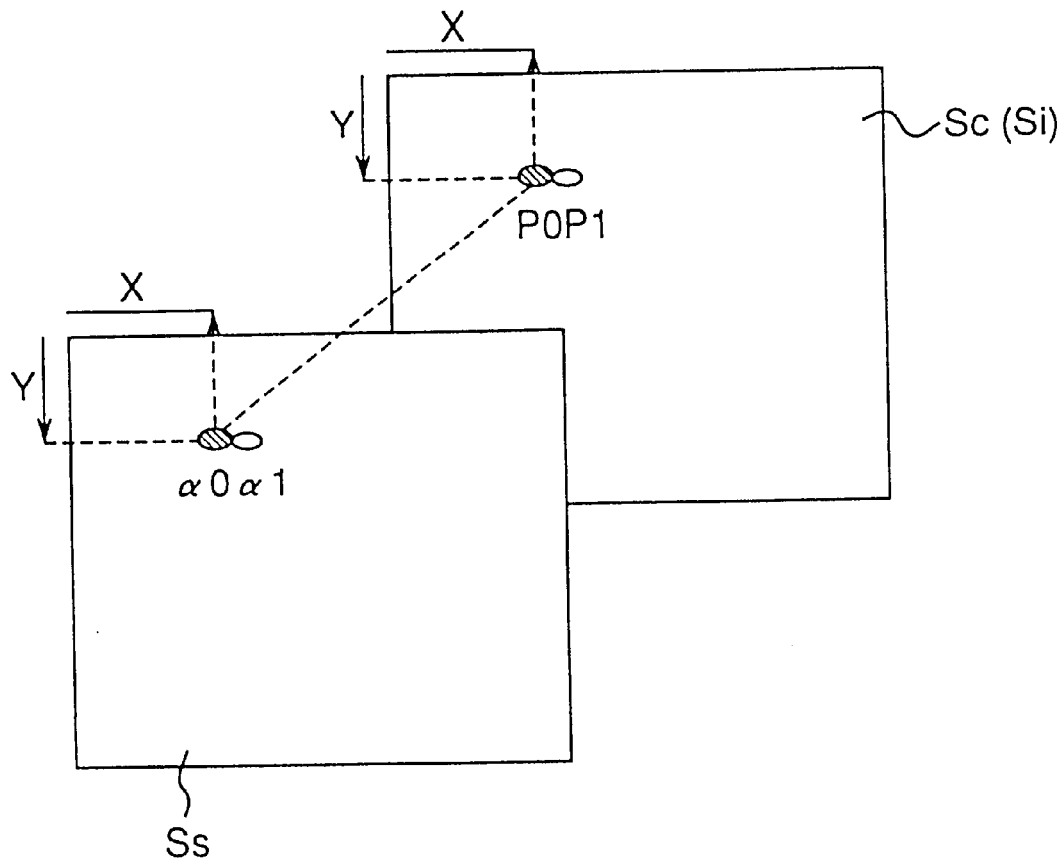

IMAGE SIGNAL CONVERSION APPARATUS AND METHOD

This is a divisional application of Ser. No. 08/818,662, filed Mar. 14, 1997 now U.S. Pat. No. 6,067,320.

BACKGROUND OF THE INVENTION

1. Field of the Invention

The present invention relates to an apparatus for encoding and decoding an image signal used for efficient image signal transmission or storage, and to a method therefor.

2. Description of the Prior Art

A method of separating moving pictures into discrete layers each containing one of normally plural objects in a moving picture image at a specific time instance has been proposed to enable the efficient transmission and storage of image signals, and particularly moving picture (video) signals, in which object images are expressed as compositions (collections) of pels. For example, when an image comprising people and background is encoded with this method, the image coding apparatus separates the image into two layers, a people layer and a background layer, and separately codes and transmits each layer.

At the receiving end, the image decoding apparatus decodes the signal encoded for each layer, and then combines the images from each of the decoded layers using a specified method to present a single integrated picture. This method must therefore also provide, for each pel in each layer, information declaring whether a particular pel hides or does not hide the background image. The information thus used to declare whether a pel hides or does not hide the background image is called "significance information," and pels that hide the background are called "significant."

This significance information can also be used to declare the interpel correlation information in images that are recorded as a single layer rather than being segmented into plural layers. However, significant pels are pels that are included in a given object, and non-significant pels are pels that are located outside a given object. A high significance information value therefore means that the ratio of a given pel to the other pels at the same position is high and that pel is visually important. Conversely, a low significance signal value means that the corresponding pel has little influence on the appearance of the output pel, i.e., is nearly transparent.

The signal comprising the significance information for a specific group of pels in the image signal is called a significance signal. When plural image objects included on different layers of the image signal are overlaid to present an image, the significance signal can be used to declare whether a particular pel hides or does not hide the background. A non-zero significance signal value in this case means that that pel is significant and hides the background. There is no significance signal value for non-significant pels, however, and non-significant pels are thus transparent and are not needed for image synthesis. As a result, the significance signal describes the shape of objects in the image, and only significant pels affect the quality of the synthesized image.

In other words, non-significant pels are unrelated to image quality, and the coding efficiency can therefore be improved by encoding only the significant pels.

When encoding image signals containing luminance, color difference, transparency, and other pel information for each pel in the image, however, conventional image signal coding apparatuses perform the same frequency conversion operation during pel subsampling and pel interpolation processing irrespective of the pel significance. As a result, non-significant pel values, i.e., meaningless pel values, affect significant pels, resulting in image quality degradation.

While the resolution of the luminance signal component of the image signal is equal to the significance signal resolution, the resolution of the color difference may be different from the significance signal resolution. In such cases there are no problems encoding the luminance signal based on the significance signal. However, if the color difference signal is coded based on the significance signal, the resolution of both signals must be the same. This means that the resolution of the significance signal must be converted to the color difference signal resolution before the color difference signal is coded. As described above, however, resolution conversion of the significance signal applies the same resolution conversion to every pel regardless of whether or not each pel is significant, and the significance signal is thus degraded in the same way coding degrades the image signal above.

Coding efficiency also drops with the conventional image signal encoding apparatus and the image signal decoding apparatus because it is also necessary to encode the pel value of nearly-transparent pels because even these nearly-transparent pels having no visual effect on the output image are handled as significant pels due to coding errors or minor noise components in the input signal.

SUMMARY OF THE INVENTION

The object of the present invention is therefore to provide an imaging device which solves these problems.

The present invention has been developed with a view towards substantially solving the above described disadvantages and has for its essential object to provide an improved electrophotographic imaging device.

In order to achieve the aforementioned objective, an image signal encoding apparatus is provided for encoding an image signal comprising two or more proximal pels based on a significance signal comprising significance elements expressing the significance value of the pels, the apparatus comprises a resolution conversion characteristics selector for selecting the resolution conversion characteristic based on the significance value of the pels proximal to the pel being processed, and a resolution converter for converting the resolution of the image signal by applying the selected resolution conversion characteristic.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which:

FIG. 1 is a block diagram of a first embodiment of an image signal encoding apparatus EC1 according to the invention;

FIG. 2 is a flow chart used to describe the operation of the image signal encoding apparatus EC1 shown in FIG. 1;

FIG. 3 is an explanatory diagram used to describe the method whereby the image signal encoding apparatus EC1 of the invention determines the resolution conversion characteristic;

FIG. 4 is a table showing the functions corresponding to the resolution conversion characteristics shown in FIG. 3;

DETAILED DESCRIPTION OF THE PREFERRED EMBODIMENTS

Figure 5:
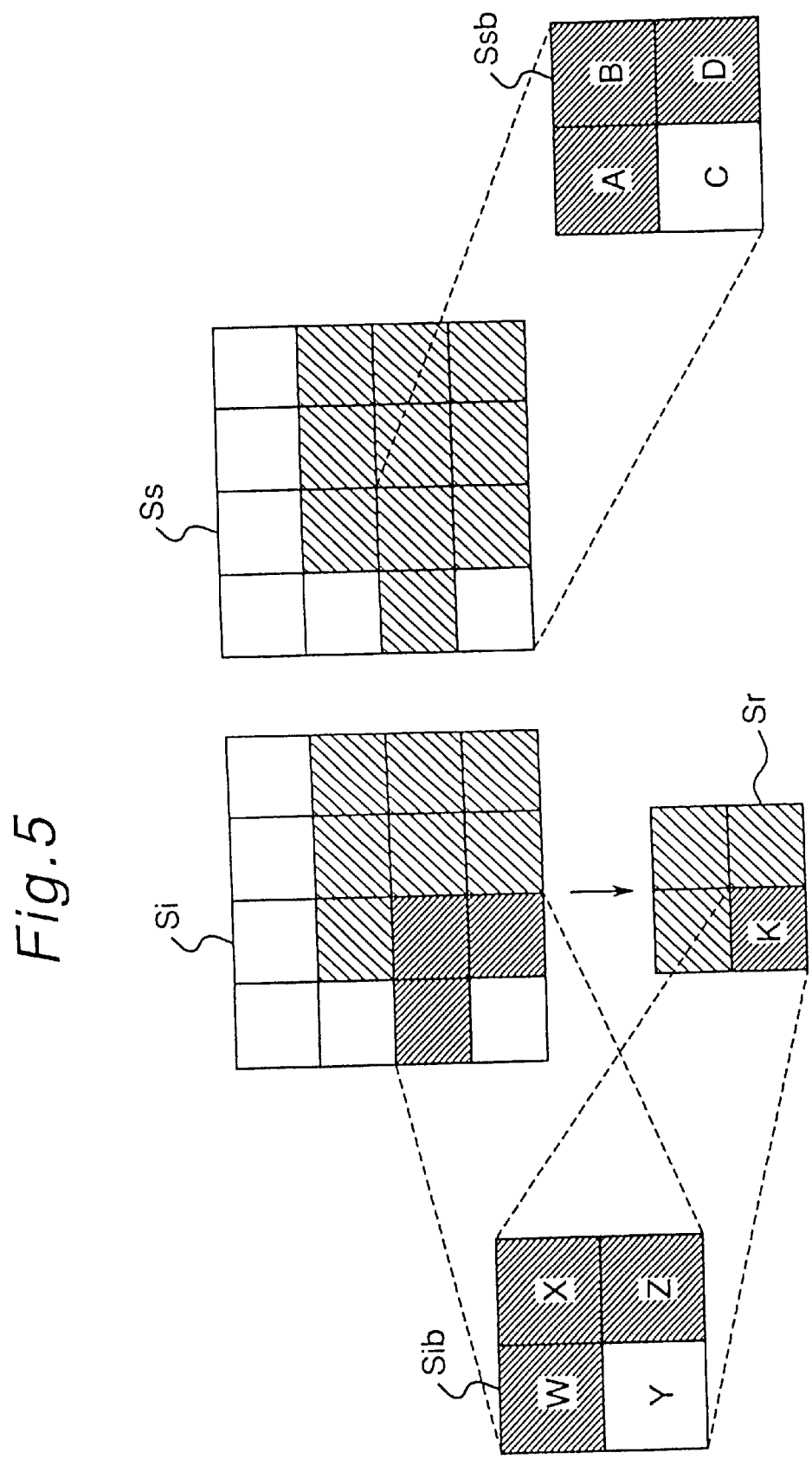
FIG. 5 is an explanatory diagram used to describe the image reduction process of an image resolution conversion apparatus based on the present invention.

In the following descriptions of the preferred embodiments the input image signal is described as comprising a two-dimensional color signal containing pel values, and a significance signal declaring, for each pel in the color signal, whether the pel value is significant or not. It should be noted, however, that the image signal can contain information other than the color signal, and the image signal shall not be limited to two-dimensional images and can express n-dimensional image information.

Embodiment 1

The structure of a first image signal encoding apparatus EC1 according to the present invention is described first below with reference to FIG. 1. This image signal encoding apparatus EC1 comprises a first input terminal Ti1, a second input terminal Ti2, a resolution conversion characteristics selector 103, a resolution converter 105, and an output terminal To.

The first input terminal Ti1 is connected to an external image signal source (not shown in the figures) from which the image signal Si is supplied. The second input terminal Ti2 is similarly connected to an external significance signal source (also not shown in the figures) from which the significance signal Ss is supplied. Note that, as described above, this significance signal Ss contains significance information for every pel in the image signal Si. Note, further, that while the significance signal Ss is normally a multilevel signal indicating the correlation between pels in the image signal Si by means of two or more values, it is primarily described for simplicity in the disclosure below as a two-level signal declaring whether a given pixel is significant or not by setting the significance signal Ss to one of two states for each pel.

For example, when the significance signal Ss is a two-level signal, it expresses whether or not the front layer pel (foreground pel) is transparent and, therefore, whether it hides or does not hide the background pel at the same position. When the significance signal Ss is a multilevel signal, however, it is possible to declare the relative transparency of each pel, thereby varying the transparency of the foreground pel and enabling the background pel to be presented to a greater or lesser degree.

Efficient encoding can also be achieved by controlling the target pixel coding based on the significance information of both the target pixel and the surrounding pixels during image coding.

The resolution conversion characteristics selector 103 is connected to the second input terminal Ti2 through which it receives the significance signal Ss. By referring to the input significance signal Ss values for the pels proximal to the pel being processed, the resolution conversion characteristics selector 103 selects the best frequency conversion characteristics for resolution conversion of the image signal Si using only significant pels, and generates a resolution conversion characteristics selection signal SL indicating which resolution conversion characteristics were selected. The method whereby the resolution conversion characteristics selector 103 determines the resolution conversion characteristics will be described further below with reference to FIG. 3 and FIG. 4.

The resolution converter 105 is connected to the first input terminal Ti1 and the resolution conversion characteristics selector 103, and respectively receives therefrom the image signal Si and the resolution conversion characteristics selection signal SL.

The resolution converter 105 internally stores the resolution conversion characteristics data for each significance level expressible by the significance signal Ss for each significant pel. Using the resolution conversion characteristics data for the resolution conversion characteristics specified by the resolution conversion characteristics selection signal SL, the resolution converter 105 then converts the image resolution by pel subsampling or interpolation of the image signal Si and outputs the result as resolution-converted image signal Sr from output terminal To.

The resolution conversion process thus executed by the present embodiment is therefore able to convert the resolution of an image signal Si by means of pel downsampling or interpolation without the result being affected by non-significant pels in the image input signal. As a result, image degradation resulting from the resolution conversion process can be prevented. The resolution conversion process executed by the resolution converter 105 is described in detail below with reference to FIG. 5, FIG. 6, FIG. 7, FIG. 8, FIG. 9, and FIG. 10.

Referring first to FIG. 2, however, the primary image signal coding operation of the image signal encoding apparatus EC1 is described below.

When the image signal encoding operation starts, the image signal Si and significance signal Ss are respectively generated by the external image signal source and the external significance signal source.

When the image signal Si is input to the resolution converter 105 through the first inputted terminal Ti1 at step #100, the significance signal Ss is also inputted to the resolution conversion characteristics selector 103 through the second input terminal Ti2.

At step #200 the resolution conversion characteristics selector 103 determines whether the significance information in the input significance signal Ss indicates whether each pel in the image signal Si is significant or not.

In the present embodiment, the significance signal Ss is a two-level signal. When the significance information value in the significance signal Ss for a particular pel in the image signal Si is a non-zero value i.e. 1, the corresponding pel in the image signal is determined to be significant, but if the significance information value is zero, the corresponding pel is determined to be non-significant.

If all significance information values in the significance signal Ss are a non-zero (1) value in this example, i.e., indicate significant pels, step #200 returns YES, the resolution conversion characteristics selector 103 generates a resolution conversion characteristics selection signal SL specifying the normal resolution conversion characteristics, and the procedure advances to step #300.

An example of these normal resolution conversion characteristics are described later below with reference to FIG. 4.

At step #300 the resolution converter 105 fetches the normal resolution conversion characteristics from the resolution conversion characteristics data stored internally based on the resolution conversion characteristics selection signal SL generated in step #200, and control then advances to step #500.

However, if at step #200 a NO is returned indicating that there is at least one non-significant pel declared by the significance signal Ss to be in the image signal Si, the resolution conversion characteristics selector 103 generates a resolution conversion characteristics selection signal SL specifying the resolution conversion characteristics corresponding to the significant pel states declared by the significance information values in the significance signal Ss so that resolution conversion is accomplished using only the significant pels. The procedure then moves to step #400.

At step #400 the resolution converter 105 fetches the resolution conversion characteristics corresponding to the current significance signal state from the resolution conversion characteristics data stored internally based on the resolution conversion characteristics selection signal SL generated in step #200. Control then advances to step #500.

At step #500 the resolution conversion based on the resolution conversion characteristics selected in either step #300 or #400 is applied to the input image signal Si to generate the resolution-converted image signal Sr. The resolution-converted image signal Sr generated by the resolution converter 105 is then output from the outputters terminal To in step #600, and the process terminates.

By thus converting the resolution of the image signal Si based on a companion significance signal Ss, the resolution of the image signal Si can be converted without being affected by non-significant pels in the image signal Si. As a result, image degradation can be prevented and the image signal coding efficiency can be improved. It should be noted that, by applying the resolution conversion process to both the image signal Si and significance signal Ss in step #400 above, it is possible to convert the resolution of the significance signal Ss as well as the image signal Si.

Referring next to FIG. 3 and FIG. 4, the resolution conversion operation of the resolution converter 105 shown in FIG. 1 is described next.

As described above, the image signal Si contains both a two-dimensional color signal Sc and a significance signal Ss corresponding to the same color signal Sc, and both the color signal Sc and significance signal Ss are shown in FIG. 3. Pel P0 in the color signal Sc represents the color signal sample (pel) at coordinates (X,Y), and P1 represents the color signal sample (pel) adjacent to pel P0. The values $\alpha 0$ and $\alpha 1$ in the two-dimensional significance signal Ss are the significance signal (significance information) values for the corresponding pels p0 and p1.

Examples of possible resolution conversion characteristics functions for the significance information values $\alpha 0$ and $\alpha 1$ are shown in FIG. 4. The possible combinations of significance information values $\alpha 0$ and $\alpha 1$ are divided into conditions C1, C2, C3, and C4 in the first column of FIG. 4. The second and third columns show the possible values for significance information values $\alpha 0$ and $\alpha 1$ where a value of 1 means the corresponding pel is significant and 0 means non-significant. The fourth column shows the resolution conversion characteristic Fc for the significance information values $\alpha 0$ and $\alpha 1$ in the same row expressed as the function Pf $=f\alpha 0$, $\alpha 1$ (P0, P1) where P0 and P1 are the same pel values from the color signal Sc shown in FIG. 3.

Note that under condition C1 both significance information values $\alpha 0$ and $\alpha 1$ are 1, thus declaring that the corresponding color pels P0 and P1 are both significant. The resolution conversion characteristic function is therefore defined by equation 1:

$$Pf=(P0+P1)/2 \qquad [1]$$

As a result resolution conversion is accomplished using the average of both pel values. Note that this conversion function shown in equation 1 corresponds to the normal resolution conversion characteristics selected in step #300 in FIG. 2.

Under condition C2 only significance information value $\alpha 0$ is 1, meaning that only the corresponding color pel P0 is significant. As a result the resolution conversion characteristic function is defined by equation 2:

$$Pf=P0 \qquad [2]$$

In other words, pel P1 is completely covered and hidden by pel P0.

Likewise under condition C3 only significance information value $\alpha 1$ is 1, meaning that only the corresponding color pel P1 is significant. The resolution conversion characteristic function is therefore defined by equation 3:

$$Pf=P1 \qquad [3]$$

In other words, pel P0 is completely covered and hidden by pel P1.

Under condition C4 both significance information values $\alpha 0$ and $\alpha 1$ are 0, meaning that neither pel P0 nor pel P1 is significant. As a result, the resolution conversion characteristic function Pf is not generated.

The operation of the resolution converter 105 is described next below with reference to FIGS. 5–10.

Referring to FIG. 5, 2×2 pel blocks in the image signal Si are converted, or downsampled, to one pel in the resolution-converted image signal Sr. This resolution conversion operation thus compresses the number of pels to ¼ the pel count in the input image signal. In other words, the input image signal comprising 4×4 pel blocks is converted to a resolution-converted image signal Sr comprising 2×2 pel blocks. More specifically, the four pel image signal block Sib comprising a 2×2 pel matrix in the lower left part of the image signal Si is converted to the one pel K in the same relative lower-left part of the resolution-converted image signal Sr by the process described below and shown FIG. 5.

As shown in FIG. 5, the image signal Si is segmented into 4×4 pel blocks, and the significance signal Ss likewise comprises corresponding 4×4 blocks of significance elements. Each significance element contains the significance information value for the corresponding pel in the image signal Si. As a result, the significance signal Ss comprises significance element block Ssb comprising 2×2 significance elements in the lower left part of the significance signal Ss corresponding to the image signal block Sib also shown in FIG. 5. Note that the significant pels and elements in the image signal Si, image signal block Sib, significance signal Ss, and significance element block Ssb are indicated by shading in FIG. 5.

More specifically, pels W, X, Y, and Z in the image signal block Sib correspond to significance elements A, B, C, and D, in the significance element block Ssb, respectively, and the significant pels in the image signal block Sib are determined to be the three pels W, X, and Z by referencing the significance element block Ssb. Note further that the value of non-significant pel Y in the image signal block Sib may be unrelated to the significant pels W, X, and Z. This means that if resolution conversion is accomplished using the pel values of all pels in the image signal block Sib, the resolution-converted image signal Sr may be adversely affected by this non-significant pel Y.

However, if the average value I of the significant pels W, X, and Z in the image signal block Sib is used as the pel block value after resolution conversion, the resolution can be converted without being affected by non-significant pels. If the values of significant pels W, X, and Z are Pw, Px, and Pz, the average pel value I of the resolution-converted pel can be expressed by equation 4:

$$I=(Pw+Px+Pz)/3 \quad [4]$$

It is thus possible to obtain pel K in the resolution-converted image signal Sr by converting the resolution of the four pel image signal block Sib in the image signal Si using the resolution conversion characteristic defined by equation 4.

It should be noted that while a 2×2 pel matrix is converted to one pel by the method described above, the invention shall not be so limited and the same principle can be applied to convert pel blocks of any N×M size (where N and M are natural numbers) at any desired compression ratio.

It should be further noted that while the above method has been described converting the resolution of the image signal only, the same method can be applied to convert the resolution of the significance signal. A specific example of significance signal resolution conversion is described next below with reference to FIG. 6.

Figure 6:
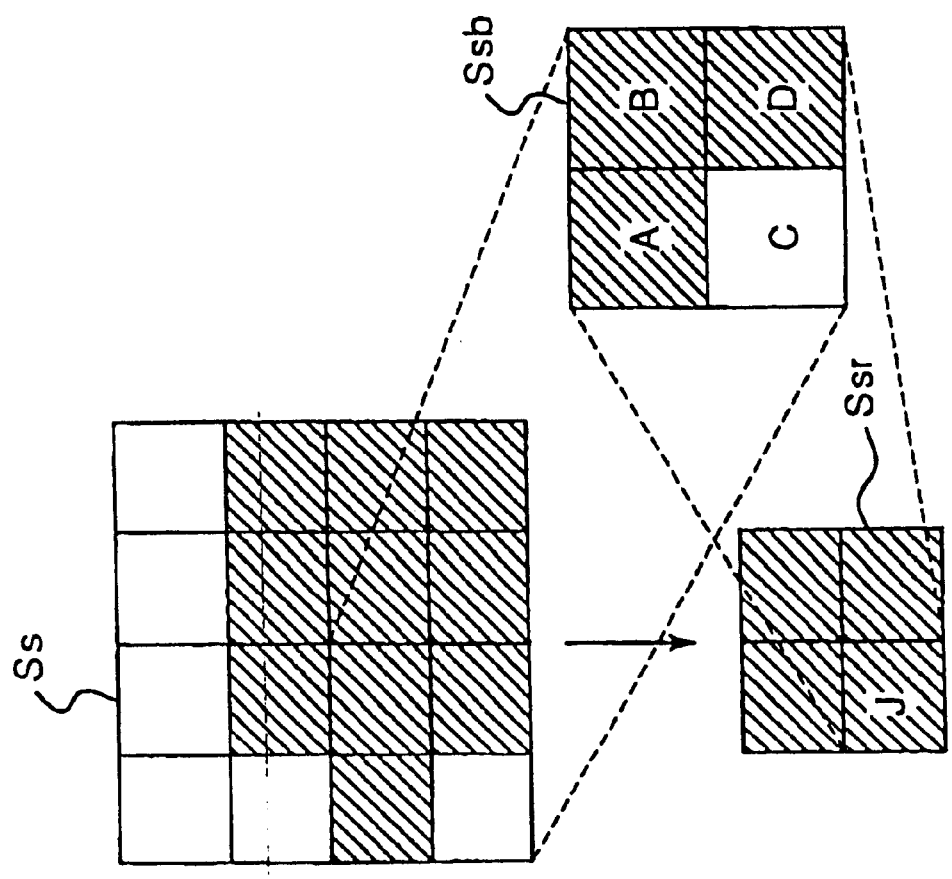
FIG. 6 is an explanatory diagram used to describe significance signal interpolation of a color difference signal by means of an image resolution conversion apparatus based on the present invention.

As shown in FIG. 6, the significance signal Ss is also segmented into 4×4 significance element blocks. The resolution conversion method described below also converts the 2×2 significance element block Ssb in the lower left part of the significance signal Ss to one significance element in the resolution-converted significance signal Ssr, thus compressing the total number of significance elements to ¼.

The average value J of the significance elements A, B, and D corresponding to the significant pels W, X, and Z is calculated as the significance element value after resolution conversion by applying equation 5:

$$J=(Va+Vb+Vd)/3 \quad [5]$$

where Va, Vb, and Vd are the significance values of the significance elements A, B, and D.

It should be further noted that while the resolution conversion method of the invention has been described using equations 4 and 5 above to convert the resolution of a 2×2 pel block as shown in FIG. 5 and FIG. 6, the invention is not limited to 2×2 matrices and can be generalized by equation 6 below where the number of pels before conversion is the integer n and a two-level significance signal value is used:

$$p = Fan(pn) \quad (6)$$
$$= (p0 \times a0 + p1 \times a1 + \ldots + pn-1 \times an-1) \Big/ \sum_{k=0}^{n-1} ak$$
$$= \left(\sum_{k=0}^{n-1} pk \times ak\right) \Big/ \left(\sum_{k=0}^{n-1} ak\right)$$

where p0 to pn on the right side of the equation are the pel values in the image signal Si being converted, α is the corresponding significance element value in the referenced significance signal Ss, and the value p on the left side of the equation is the pel value in the resolution-converted image signal Sir obtained by equation 6.

When multilevel significance element values are used, the invention can be generalized by equation 7 below:

$$p = Fw(pn) \quad (7)$$
$$= (p0 \times w0 + p1 \times w1 + \ldots + pn-1 \times wn-1) \Big/ \sum_{k=0}^{n-1} wk$$
$$= \left(\sum_{k=0}^{n-1} pk \times wk\right) \Big/ \left(\sum_{k=0}^{n-1} wk\right)$$

where p0 to pn on the right side of the equation are the pel values in the image signal Si being converted, w is a pointer indicating whether the corresponding significance element value in the referenced significance signal Ss is 0 or not, and the value p on the left side of the equation is the pel value in the resolution-converted image signal Sir obtained by equation 7. Regarding the pointer w, pointer w is 0 if the significance element value is 0, and pointer w is 1 if the significance element value is not 0.

While each of the above examples has been described taking an average value, resolution conversion can also be accomplished by obtaining the logical OR of the significance element values in the significance signal Ss as shown in equation 8 if the input signal is a two level signal:

$$\alpha=\alpha0[+]\alpha1[+] \ldots [+]\alpha n-1 \quad [8]$$

where [+] on the right side of the equation indicates a logical OR operation. Thus, even if any one of significant elements α0 to αn is significant, the result is essentially significant.

On the other hand, it is possible to establish that even if any one of significant elements α0 to αn is not singnificant, the result would be not significant, as defined by the following equation:

$$\alpha=\alpha0[x]\alpha1[x] \ldots [x]\alpha n-1 \quad [9]$$

where [x] on the right side of the equation indicates a logical AND operation.

The image signal encoding operation of the image signal encoding apparatus EC1 described briefly above with reference to FIG. 2 is described in further detail below with reference to the flow chart in FIG. 7. Even more specifically, the resolution conversion operation of a significance signal Ss having N significance elements is described. It should be noted that while the following example describes the method of converting the resolution of the significance signal Ss itself, it will be obvious that resolution conversion of the image signal Si can be accomplished using the same method as already explained above.

Operation starts by system initialization in step S2. This step specifically resets the significance counter CS, non-significance counter CNS, significance element counter n, significant element position pointer PS and non-significant element position pointer PNS. In the present embodiment, this step specifically resets the significance counter CS, non-significance counter CNS, and significance element counter n to 1, and clears the significant element position pointer PS and non-significant element position pointer PNS. When initialization is completed the process steps to step S4.

Figure 7:
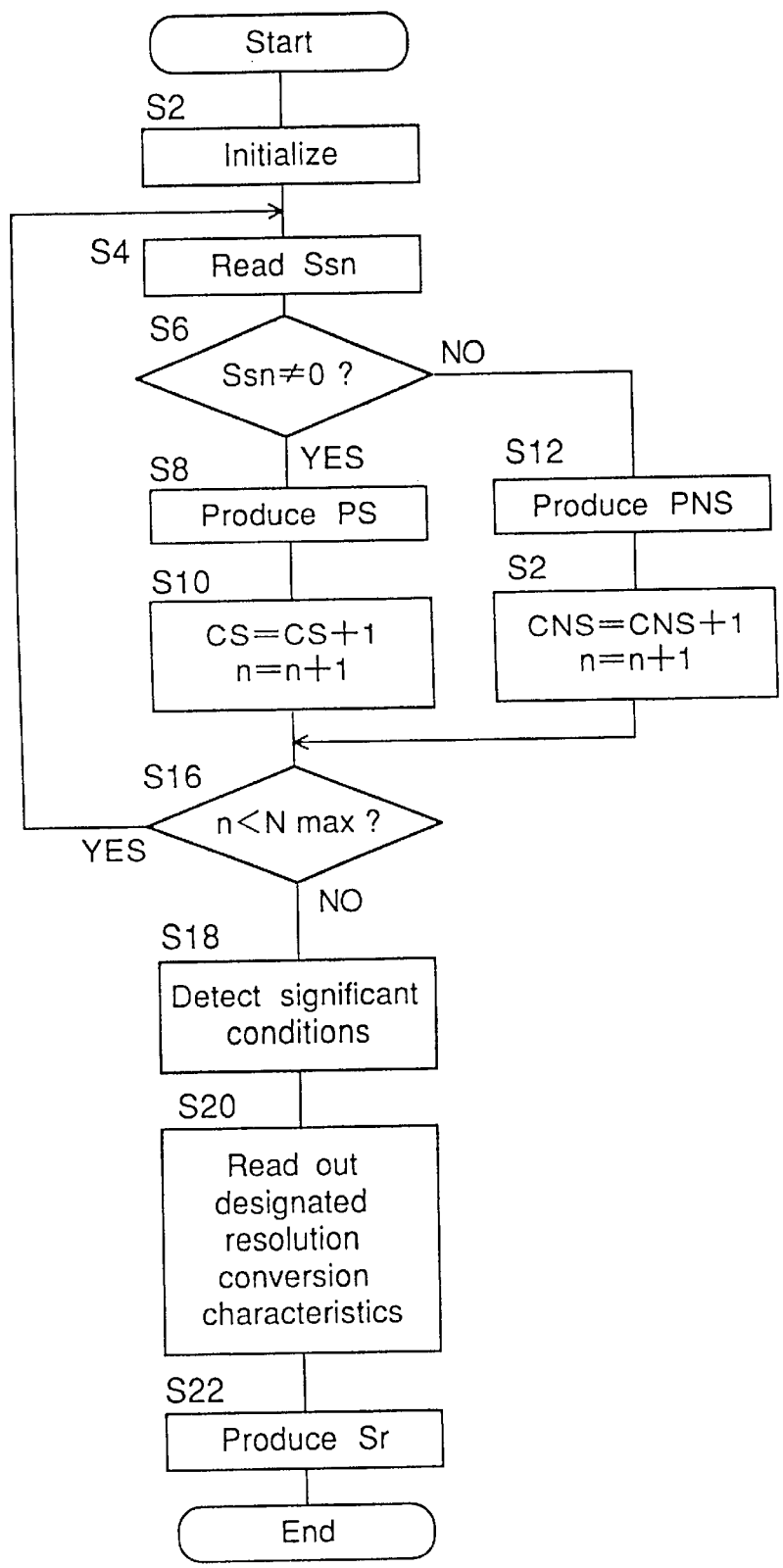
FIG. 7 is a flow chart used to describe the operation of the image signal encoding apparatus EC1 shown in FIG. 2 in greater detail.

With each pass through the significance state detection cycle shown as the loop from step S4 to step S16 in FIG. 7, the resolution conversion characteristics selector 103 reads the $n^{th}$ significance element Ssn in the significance signal Ss being converted (step S4), and then advances to step S6. Note again that n is the significance element counter n, and the first significance element detected to be "significant" is expressed as significance element Ss1. The significance counter CS is also 1.

At step S6 it is determined whether the value of the read significance element Ssn is 0, i.e., whether or not the corresponding significance element is significant. If the significance element value is not 0, i.e., the significance element is significant, YES is returned and the procedure steps to step S8.

Based on the current values of the significance element counter n and the significance counter CS, the position of the significance element Ssn in the significance signal Ss is recorded to a significant element position pointer PS. The procedure then steps to step S10. Note that the first time a significant element is detected after the resolution conversion process starts the value of both the significance element counter n and the significance counter CS is 1.

At step S10 both the significance counter CS and significance element counter n are incremented by 1. The procedure then steps to step S16.

Referring back to step S6, however, if the significance element being detected is not significant, step S6 returns NO. The procedure then steps to step S12.

In this case the position of the significance element Ssn in the significance signal Ss is recorded to a non-significant element position pointer PNS based on the current values of the significance element counter n and the non-significance counter CNS (step S12). The procedure then steps to step S14.

At step S14 both the non-significance counter CNS and significance element counter n are incremented by 1. The procedure then steps to step S16.

At step S16 it is determined whether there are any significance elements for which the significance state has yet to be detected. More specifically, it is determined whether the significance element counter n<Nmax where Nmax is the total number of significance elements in the significance signal Ss being processed. If YES, i.e., n<Nmax, there are still significance elements for which the significance state has not been detected, and the procedure therefore loops back to the beginning of the significance state detection cycle (step S4). If NO, i.e., n=Nmax, the significance state of all significance elements has been detected. In this case the procedure then steps to step S18.

The process described above thus causes the significance state detection cycle from step S4 to step S16 to be repeated until step S16 returns NO, thereby assuring that the significance state of every significance element in the significance signal Ss is detected.

At step S18 the resolution conversion characteristics selector 103 selects the resolution conversion characteristics best suited to the significance signal Ss being processed based on the significance element information obtained by step S8 or step S12. The resulting resolution conversion characteristics selection signal SL thus generated is then passed to step S20.

Based on the resolution conversion characteristics selection signal SL generated in step S18, the specified resolution conversion characteristic is read from internal storage in step S20. The procedure then steps to step S22.

Based on the resolution conversion characteristic read in step S20, the resolution of the significance signal Ss is then converted in step S22 to generate the resolution-converted image signal Sr resolution-converted significance signal Ssr. The procedure then terminates.

It should be noted that, with the process shown in the flow chart in FIG. 7, the significance state of the significant elements is detected in steps S8 and S10, and the significance state of the non-significant elements is detected in steps S12 and S14, based on the determination of whether each significance element is significant or not in step S6. However, it is also possible to specify the position and value of a significance element using the value of the significance element counter n whether or not the significance element is significant or not. More specifically, it is also possible to obtain the information for the non-significant elements by only obtaining the significance information for the significant elements in steps S8 and S10 following step S6. In this case steps S12 and S14 can be eliminated with control skipping from step S6 directly to step S16 when step S6 returns NO. It will also be obvious that the converse is also true, i.e., steps S8 and S10 can be eliminated and the significance information obtained based on the non-significant element information obtained in steps S12 and S14.

An alternative embodiment of the resolution conversion method of the invention is described below with reference to FIG. 8. The flow chart in FIG. 8 differs from that in FIG. 7 in that steps S12 and S14 are replaced by step S16, step S16 loops back to step S4, and step S10 advances directly to step S18. This configuration causes the resolution conversion process to be accomplished even if only one significance element in the significance element block is "significant," and it is not necessary to delay the resolution conversion process until the significance information value of every significance element has been detected as is necessary with the control process shown in FIG. 7.

Figure 8:
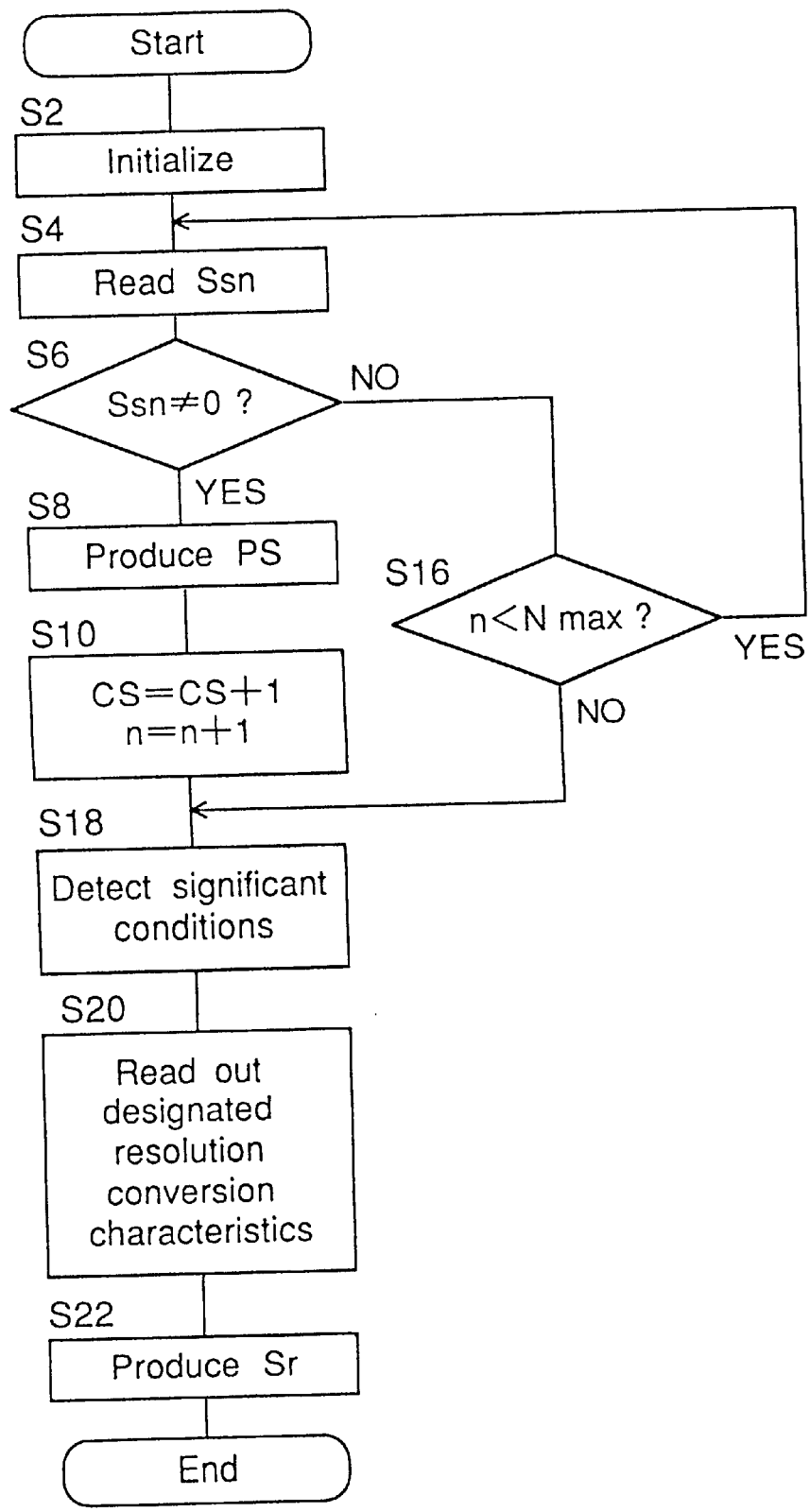
FIG. 8 is a flow chart used to describe an alternative embodiment of the operation of the image signal encoding apparatus shown in FIG. 7.

It will also be obvious that by replacing steps S12 and S14 with steps S8 and S10 in FIG. 8, i.e., eliminating steps S8 and S10 and passing from step S14 to step S18, the resolution conversion process will be accomplished even if only one significance element in the significance element block is non-significant.

Figure 9:
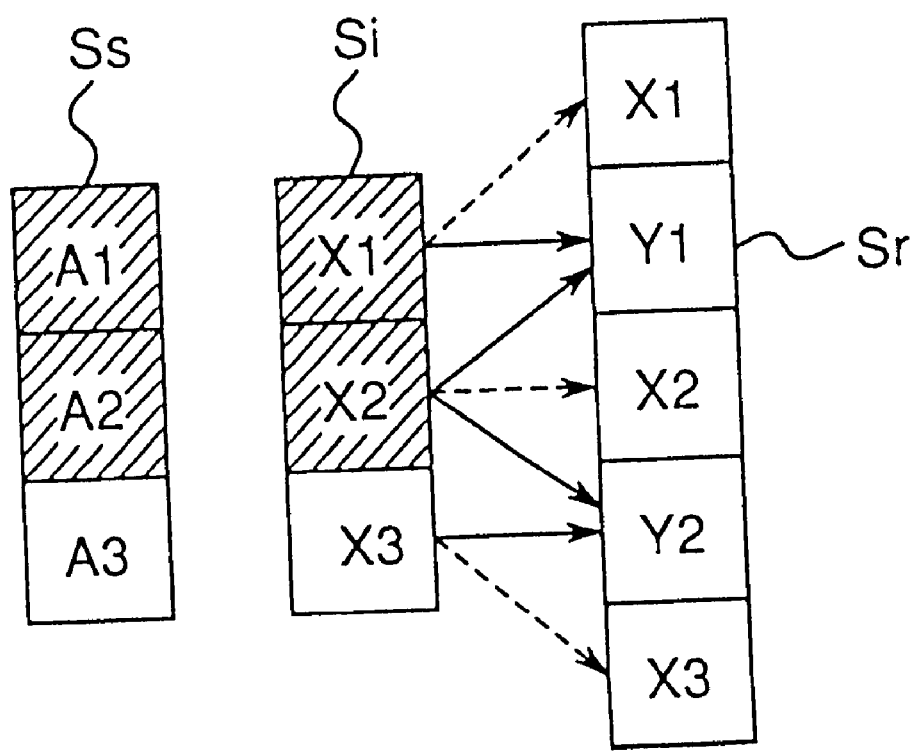
FIG. 9 is an explanatory diagram used to describe the image enlargement process of an image resolution conversion apparatus based on the present invention.

A resolution conversion method using upsampling is described next referring to FIG. 9. FIG. 9 shows the process whereby a three pel image signal Si is converted to a five pel resolution-converted image signal Sr. As shown in FIG. 9 the source image signal Si comprises three pels X1, X2, and X3, and the corresponding significance signal Ss comprises significance elements A1, A2, and A3.

As described above, pels X1, X2, and X3 correspond to significance elements A1, A2, and A3; pels X1 and X2 are significant.

In this example pels X1, X2, and X3 of the image signal Si correspond directly to the odd-numbered pels X1, X2, and X3 counting from the top of the resolution-converted image signal Sr, but the even-numbered pels Y1 and Y2 are generated by the resolution conversion process using only the significant pels in the source image signal Si. In other words, pels Y1 and Y2 are generated from significant pels X1 and X2 using the conversion characteristic defined in equation 9:

$$Y1=(X1+X2)/2  Y2=X2 \quad [9]$$

where X1, X2, Y1, and Y2 are the pel values of the corresponding pels.

Figure 10:
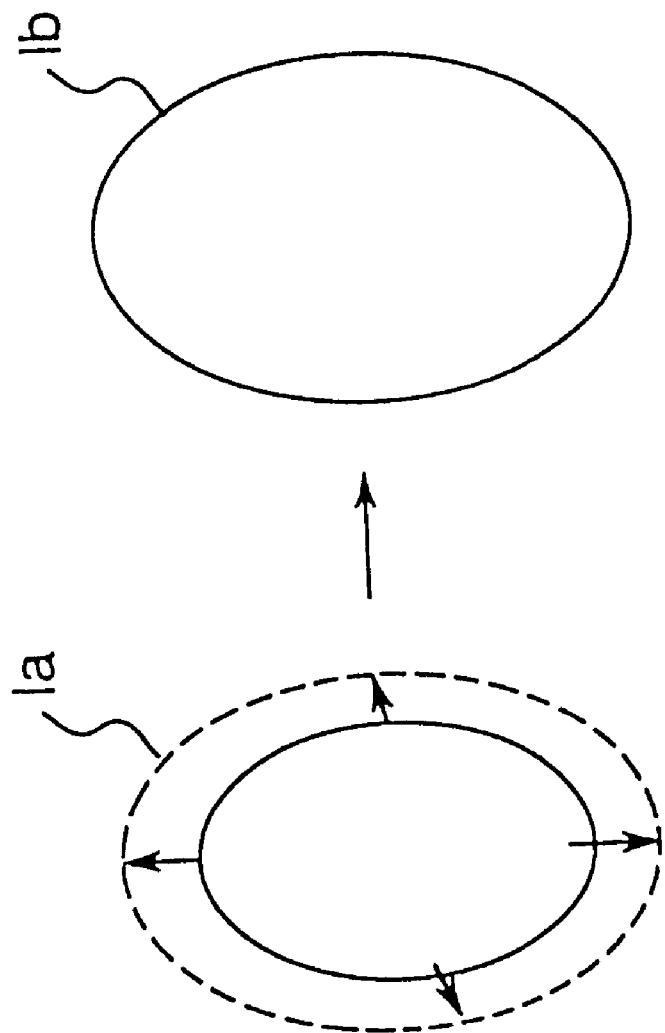
FIG. 10 is an explanatory diagram used to describe the resolution conversion of two temporally continuous images based on the present invention.

Resolution conversion of two images Ia and Ib that are continuous on the time base is described referring to FIG. 10. As shown in FIG. 10, the image Ia appearing first on the time base is smaller than the image Ib presented thereafter. In this case the upsampling conversion process described in FIG. 9 above can be applied between the preceding image signal Sia and the following image signal Sib corresponding to images Ia and Ib to efficiently code and correlate the images. This process can be applied to achieve temporal scalability.

Embodiment 2

Figure 11:
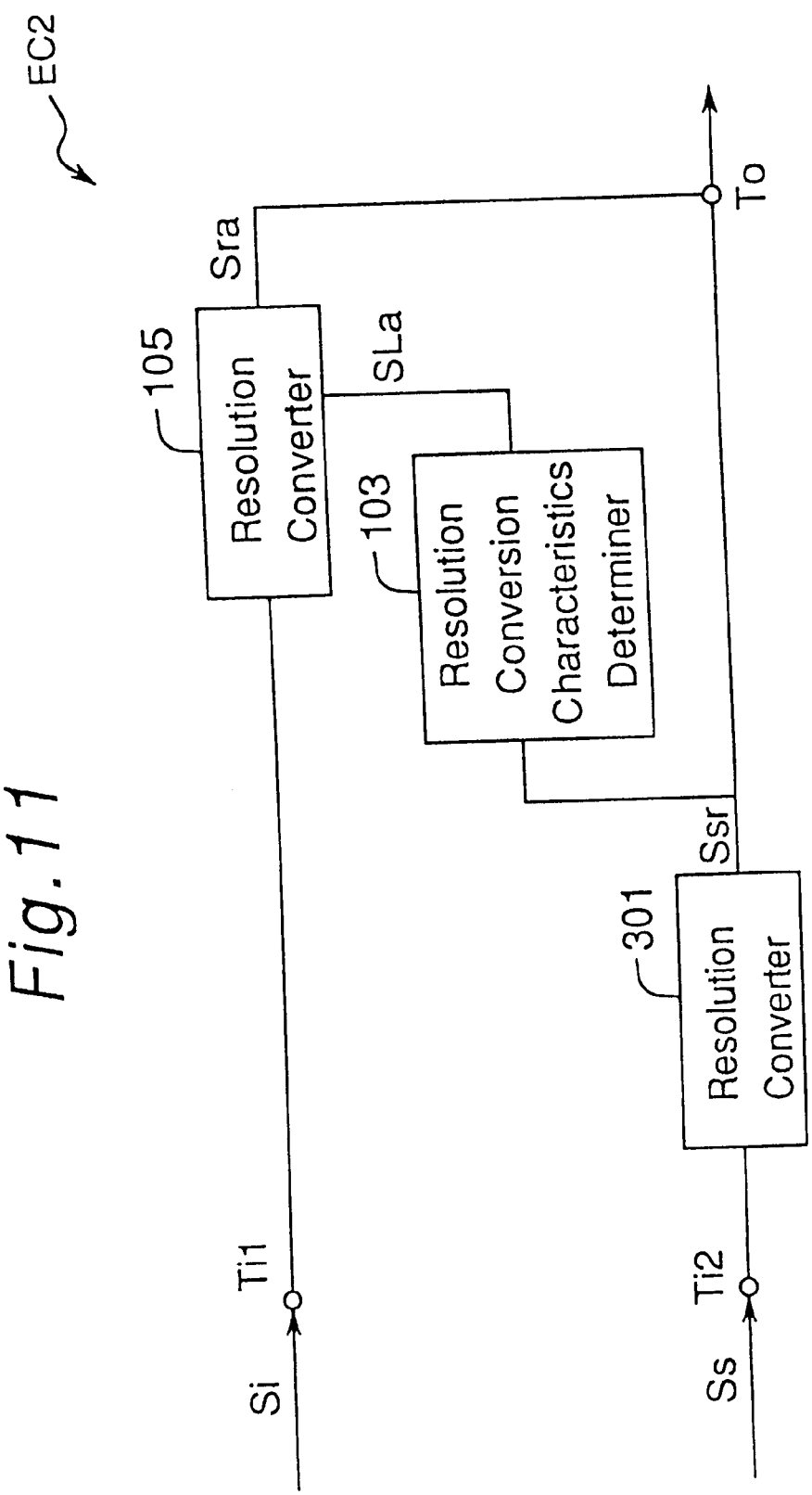
FIG. 11 is a block diagram of a second embodiment of an image coding apparatus according to the invention.

A second embodiment of an image signal encoding apparatus EC2 according to the invention is described below with reference to FIG. 11. The image signal encoding apparatus EC2 of this embodiment differs from the image signal encoding apparatus EC1 mentioned above in that it converts the resolution of only significant pels in the image signal Si.

The image signal encoding apparatus EC2 of this embodiment is similar in construction to the image signal encoding apparatus EC1 of the first embodiment and differs in the addition of a second resolution converter 301 between the resolution conversion characteristics selector 103 and the second input terminal Ti2. This second resolution converter 301 converts the resolution of the significance signal Ss to generate a resolution-converted significance signal Ssr. This resolution-converted significance signal Ssr is then outputted to the resolution conversion characteristics selector 103 and to the output terminal To.

The significance signal Ss inputted to the second resolution converter 301 is converted by means of pel downsampling or interpolation using the same process described for the resolution converter 105 in the first embodiment above.

By referring to the significance signal values in the output signal Ssr of the second resolution converter 301 for the pels proximal to the pel currently being processed, the resolution conversion characteristics selector 103 then generates the resolution conversion characteristics selection signal SLa for selecting the resolution conversion characteristic to be used for resolution conversion of the image signal Si using only the significant pels.

If no significant pels are indicated by the resolution-converted significance signal Ssr, it is not necessary to convert the image signal Si to interpolate significant pels into the resolution-converted image signal. The resolution conversion characteristics selection signal SLa indicating the most easily calculable function is therefore generated.

As in the image signal encoding apparatus EC1 of the first embodiment, the resolution converter 105 converts the resolution of the image signal Si using the resolution conversion characteristic specified by the resolution conversion characteristics selection signal SLa, thereby generating the resolution-converted image signal Sra output to the output terminal To.

The process executed by the present embodiment thus first converts the resolution of the significance signal Ss by means of the second resolution converter 301, which supplies a significance signal Ss containing only significant values to the resolution conversion characteristics selector 103. The resolution conversion characteristic used for image signal Si conversion is then selected based on this resolution-converted significance signal Ssr. The resolution of the image signal Si is then converted by downsampling or interpolation free of the effects of non-significant pels in effectively the same manner as the image signal encoding apparatus EC1 of the first embodiment, thereby achieving comparable converted image quality using fewer function calculations.

Embodiment 3

Figure 12:
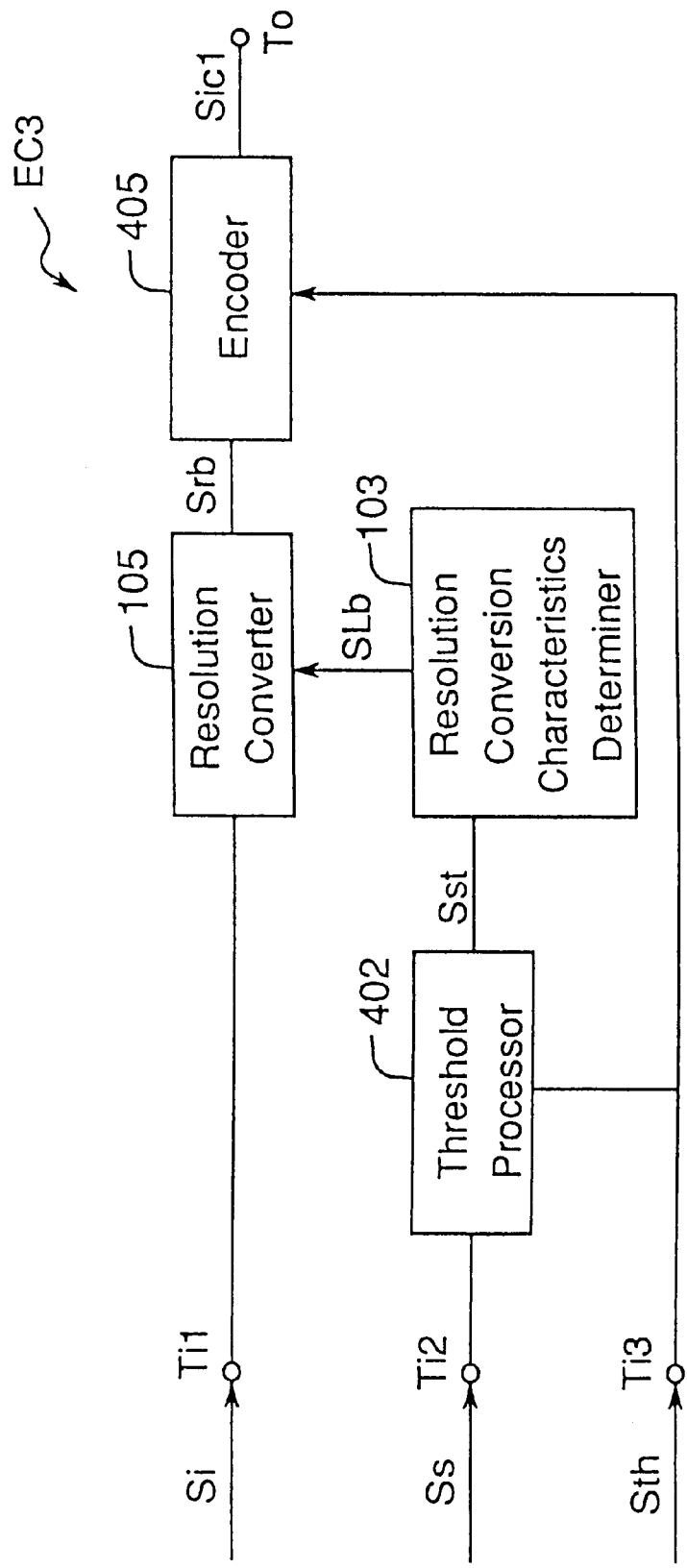
FIG. 12 is a block diagram of a third embodiment of an image coding apparatus according to the invention.

An image signal encoding apparatus EC3 according to the third embodiment of the invention is described next with reference to FIG. 12. In this embodiment the image signal encoding apparatus EC3 N-quantizes the significance signal Ss by means of a threshold processor before proceeding with the encoding process.

The image signal encoding apparatus EC3 of this embodiment is also similar to the image signal encoding apparatus EC1 shown in FIG. 1, and further comprises a third input terminal Ti3 to which a threshold signal Sth containing a specific threshold value Th is supplied. A threshold processor 402 is also added between the second input terminal Ti2 and the resolution conversion characteristics selector 103. The threshold processor 402 is also connected to the third input terminal Ti3, and thus receives the significance signal Ss from the second input terminal Ti2 and the threshold signal Sth from the third input terminal Ti3.

An encoder 405 is also added between the resolution converter 105 and the output terminal To. The encoder 405 is also connected to the third input terminal Ti3 from which the threshold signal Sth is input.

The threshold processor 402 compares the significance signal Ss with the threshold signal Sth. When the significance value of the significance signal Ss is less than the threshold signal Sth value, that significance value of the significance signal Ss is converted to a non-significant value and outputted to the resolution conversion characteristics selector 103 as the threshold-value-converted significance signal Sst. Note that significance signals Ss having only non-significant values are not processed by the threshold processor 402 and are outputted directly as the significance signal Sst.

The resolution conversion characteristics selector 103 then generates the resolution conversion characteristics selection signal SLb specifying the resolution conversion characteristic best for the image signal Si based on the threshold-value-converted significance signal Sst, and outputs the resolution conversion characteristics selection signal SLb to the resolution converter 105. The resolution converter 105 then generates the resolution-converted image signal Srb by converting the image signal Si supplied from the first input terminal Ti1 using the optimal resolution conversion characteristic based on the resolution conversion characteristics selection signal SLb.

The encoder 405 then encodes the resolution-converted image signal Srb supplied from the resolution converter 105 and the threshold signal Sth supplied from the third input terminal Ti3, and outputs the resulting encoded image signal Sic1 from the output terminal To.

Figure 13:
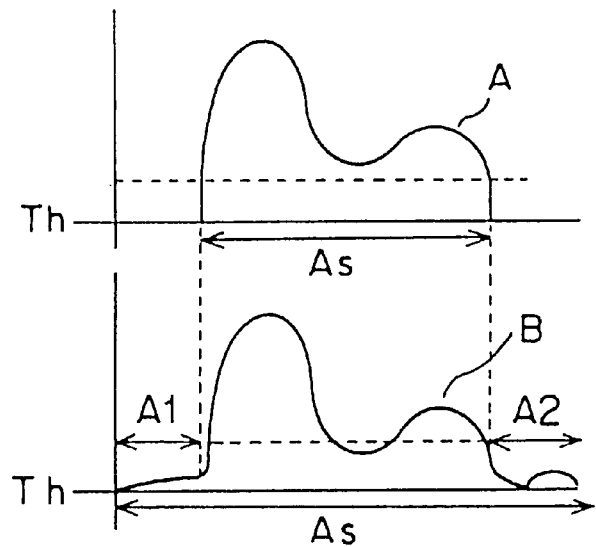
FIG. 13 is an explanatory diagram used to describe the significance signal threshold value conversion of the present invention.

The significance of generating the threshold-value-converted significance signal Sst is described below referring to FIG. 13. As described above, the invention encodes the image signal Si or even the significance signal Ss by referring to the significance signal Ss. When the significance signal Ss is a multilevel signal, however, even low level significance values indicating nearly-transparent pels that are visually indistinguishable from the surrounding pels are treated as significant values and encoded, thus adversely affecting the encoding process. Signal B in FIG. 13 is an example of such a significance signal Ss. This significance signal Ss (B) is greater than 0 in the regions indicated by arrow As, and is therefore significant throughout this region As.

While the significance of ends A1 and A2 of region As is so low that the pels in this area cannot be visually distinguished from other pels, they are factors contributing to degradation of the encoded data. Therefore, by applying a threshold value filtering process to convert elements below an appropriate threshold value Th in region As of the significance signal Ss to 0, the significance signal Ss shown as signal A in FIG. 13 can be obtained.

By thus filtering the significance signal Ss with the above threshold process, loss of coding efficiency due to low-significance pels can be prevented, and high efficiency and high image quality image signal coding can be achieved.

Note that while the present embodiment has been described as resolution converting the image signal Si based on the threshold-value-converted significance signal Sst, it is also possible to output the threshold-value-converted significance signal Sst from the threshold processor 402 directly to the encoder 405 to encode the threshold-value-converted significance signal Sst itself.

Embodiment 4

Figure 14:
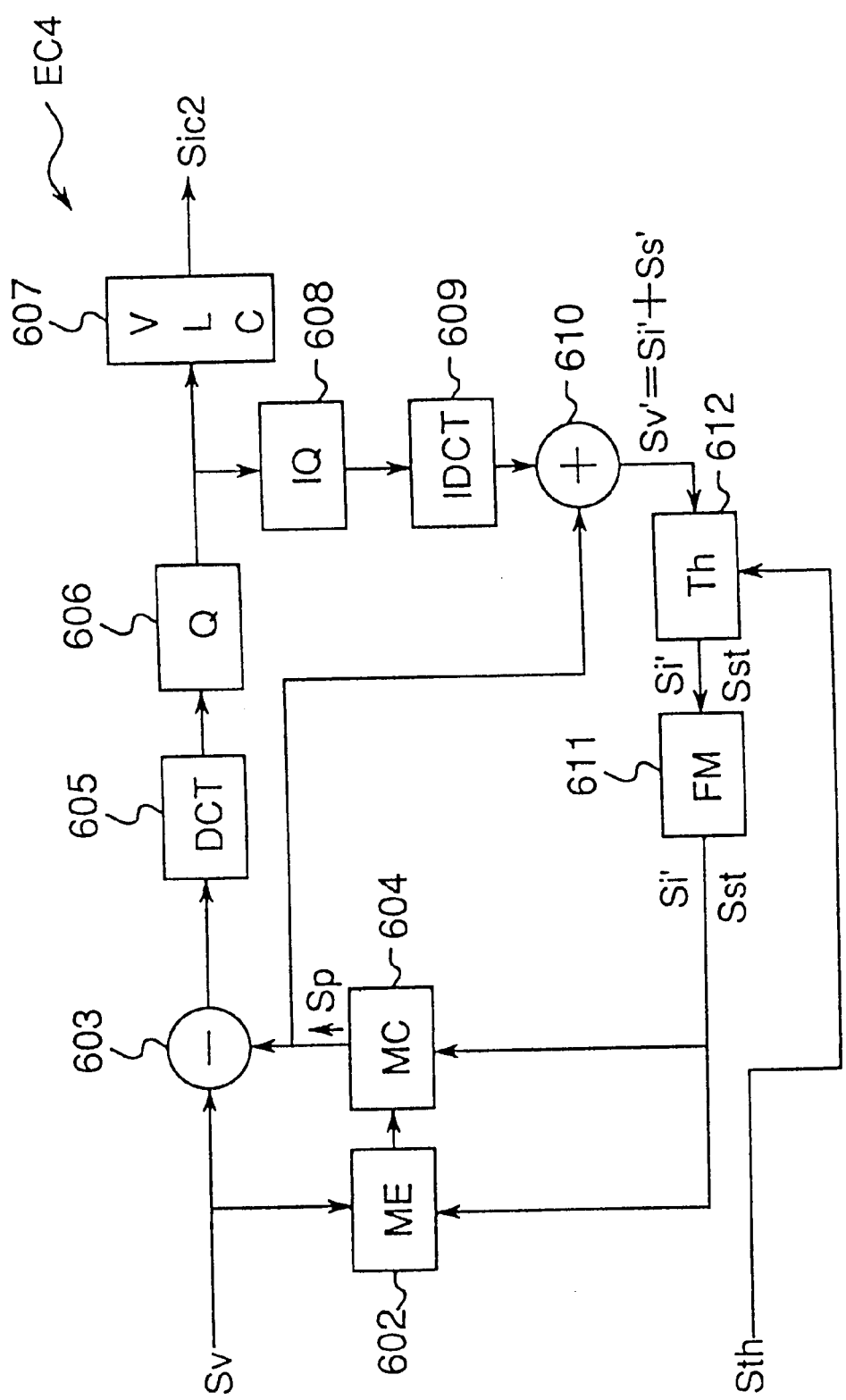
FIG. 14 is a block diagram of a fourth embodiment of an image coding apparatus according to the invention.

An image signal encoding apparatus EC4 according to the fourth embodiment of the invention is described below with reference to FIG. 14, a block diagram thereof.

A two-dimensional image input signal Sv comprising an image signal Si and a significance signal Ss declaring for each pel in the image signal Si whether each pel is significant is inputted to this image coding apparatus. The motion vectors of the input signal are detected by the motion vector detector (ME) 602 and outputted therefrom to the motion compensator (MC) 604. The motion compensator (MC) 604 uses the output from the motion vector detector (ME) 602 and the output from a frame memory (FM) 611 to generate a predictive picture signal Sp.

A difference value is then obtained for each pel by the subtracter 603 using the pel values of the predictive picture signal Sp generated by the motion compensator (MC) 604 and the input image signal Sv. This difference value is then converted by a discrete cosine transform (DCT) operation applied by the orthogonal converter (DCT) 605, and the DCT coefficients are quantized by quantizer (Q) 606.

The quantized values are outputted to the variable length coder (VLC) 607 and the dequantizer (IQ) 608. The dequantizer (IQ) 608 dequantizes the DCT coefficients, and the orthogonal conversion inverter (IDCT) 609 calculates the inverse DCT (IDCT).

The output of the orthogonal conversion inverter (IDCT) 609 is then added by adder 610 to the pel values generated by the motion compensator (MC) 604, and outputted to the threshold processor (Th) 612 as reproduction image signal Sv'. Note that this reproduction image signal Sv' contains both a reproduction image signal Si' and reproduction significance signal Ss'. The threshold processor (Th) 612 applies a threshold value process to only the reproduction significance signal Ss' component to convert values below the threshold signal Sth to a non-significant value. The result is outputted as significance signal Sst.

This significance signal Sst and the reproduction image signal Si' are stored to frame memory (FM) 611 as the decoded image signal. If the sum signal output of the adder 610 is stored directly to the frame memory (FM) 611, visually non-significant significance signal values and minor noise components will be used when predicting the next image. This reduces motion compensation efficiency. This loss of efficiency can be prevented by passing the signal through the threshold processor (Th) 612. The decoded image signal is outputted from the frame memory (FM) 611 to the vector detector (ME) 602 and the motion compensator (MC) 604.

The signal coded by the variable length coder (VLC) 607 is outputted as the output signal Sic2 of the image signal encoding apparatus EC4.

The image signal encoding apparatus of the present embodiment can thus correctly code the input signal Sv without applying motion compensation to the visually non-significant significance signal values and minor noise components, and thereby obtain an efficiently coded output signal Sic.

Embodiment 5

Figure 15:
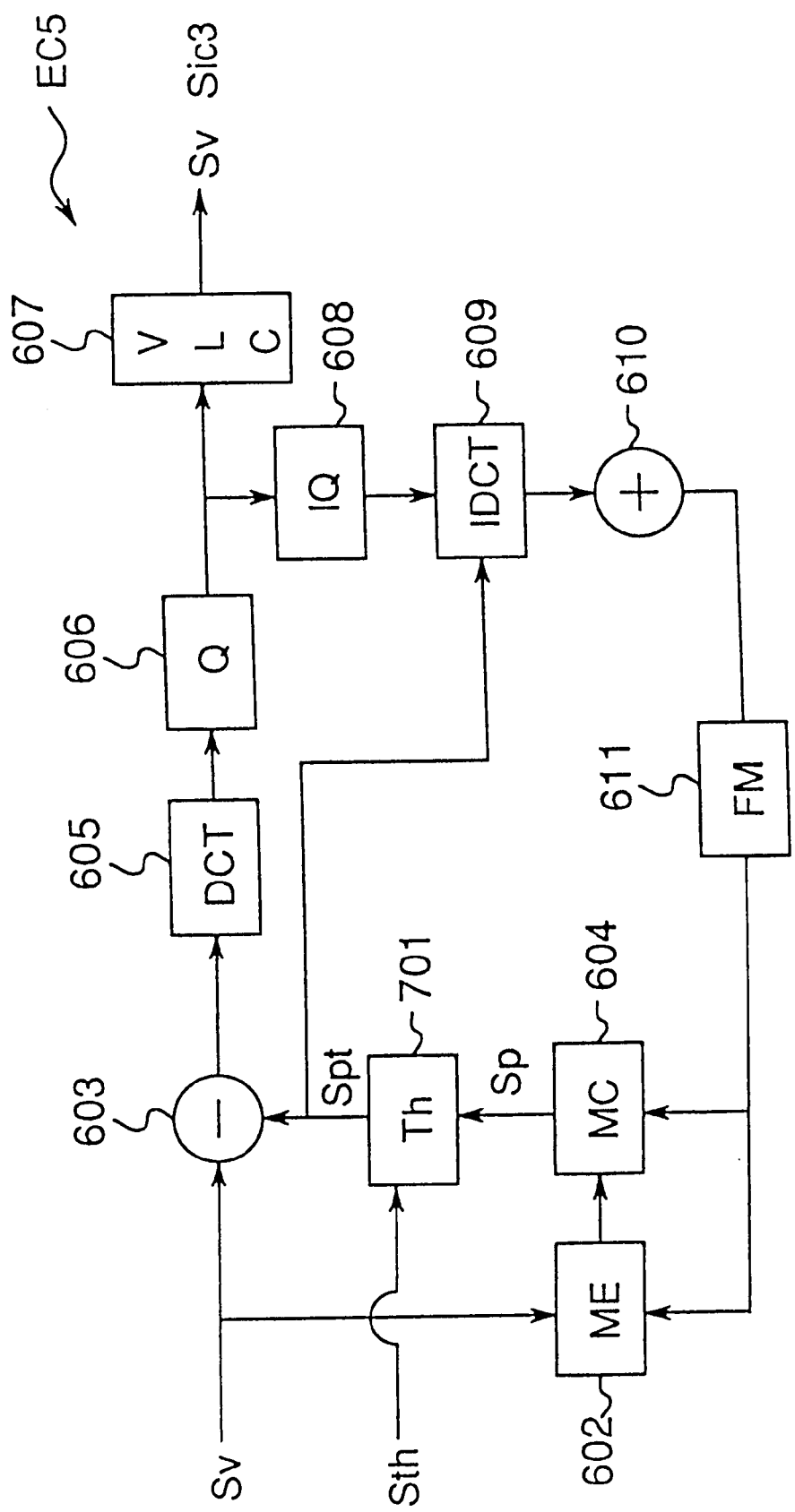
FIG. 15 is a block diagram of a fifth embodiment of an image coding apparatus according to the invention.

An image signal encoding apparatus EC5 according to the fifth embodiment of the invention is described below with reference to FIG. 15, a block diagram thereof.

The motion vectors of the two-dimensional image input signal Sv are detected by the motion vector detector (MC) 602 and outputted therefrom to the motion compensator (MC) 604. Based on the output from the motion vector detector (ME) 602 and the frame memory (FM) 611 described below, the motion compensator (MC) 604 generates a predictive picture signal Sp.

The reproduction image signal Sv' comprising the significance signal Ss' and the reproduction image signal Si' are outputted from the adder 610 directly to the input of the frame memory (FM) 611.

The motion compensator (MC) 604 then generates the predictive picture signal Sp based on the significance signal Ss' and reproduction image signal Si' from the frame memory (FM) 611. Because visually unimportant significance signal Ss' is included in the predictive picture signal Sp generated by the motion compensator (MC) 604, these values are filtered out by means of threshold processor (Th) 701 converting values that are equal to or below the threshold value Sth to a non-significant value, thereby generating threshold-value-converted predictive picture signal Spt. Coding efficiency is improved by thus removing any visually non-significant significance signals.

A difference value is then obtained for each pel by the subtracter 603 using the pel values of the input signal Sv and the output of the threshold processor 701. The discrete cosine transform (DCT) and DCT coefficients of these difference values are then obtained by orthogonal converter (DCT) 605, and the DCT coefficients are quantized by quantizer (Q) 606. The quantized values are outputted to the variable length coder (VLC) 607 and the dequantizer (IQ) 608. The dequantizer (IQ) 608 dequantizes the DCT coefficients, and the orthogonal conversion inverter (IDCT) 609 calculates the inverse DCT (IDCT).

The output of the orthogonal conversion inverter (IDCT) 609 is then added by adder 610 to the pel values generated by the threshold processor (Th) 701, and stored as the decoded image to frame memory (FM) 611.

The signal coded by the variable length coder (VLC) 607 is outputted as the encoded signal Sic of the image signal encoding apparatus EC5.

By thus removing the visually non-significant significance signal values, the image signal encoding apparatus of the present embodiment can efficiently code the input signal Sv and thereby obtain the coded output signal Sic3.

Embodiment 6

Figure 16:
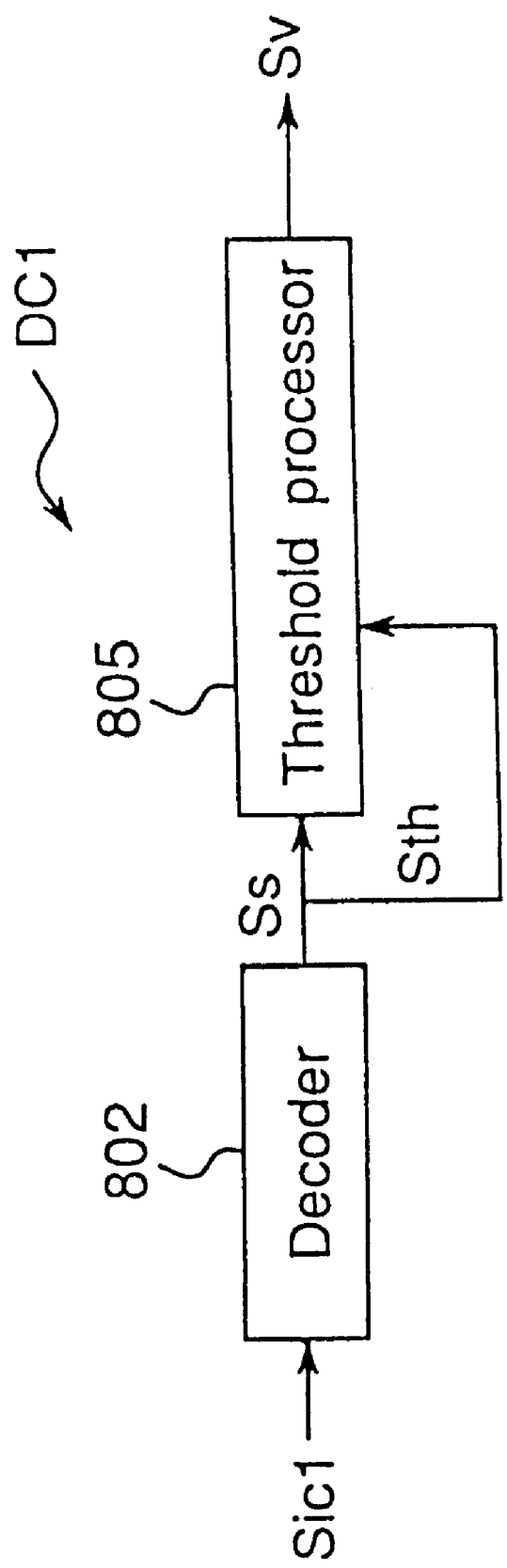
FIG. 16 is a block diagram of an image decoding apparatus according to a sixth embodiment of the invention.

An image decoding apparatus DC1 according to the sixth embodiment of the invention is described next with reference to FIG. 16, a block diagram thereof. Note that this image decoding apparatus DC1 is used to decode the encoded image signal Sic1 generated by the image signal encoding apparatus EC3 shown in FIG. 12.

The encoded image signal Sic1 is inputted to the decoder 802 for decoding to the significance signal Ss and threshold signal Sth. The decoded significance signal Ss and threshold signal Sth are both supplied to the threshold processor 805 for threshold processing as described below, and the result is outputted as output signal Sv.

Figure 17:
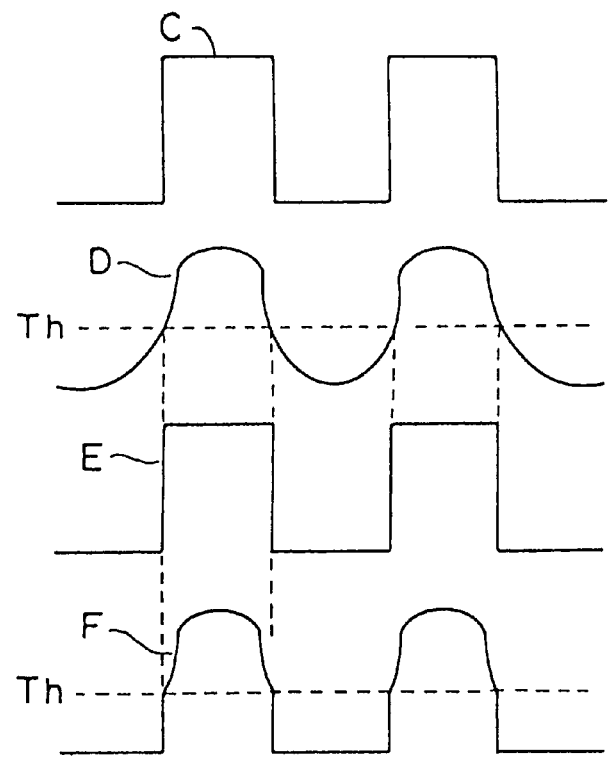
FIG. 17 is used to describe how image quality is improved by the threshold value processing operation of the invention.

Examples of the image quality being improved by the threshold value process described above are described below using the four waveforms C, D, E, and F shown in FIG. 17.

Waveform C is the input significance signal Ss, and D is the significance signal C after conversion processing. Output waveform D is binarized to the two-level signal E by quantizing signal values less than threshold value Th to 0 and all other values to 1. Rounding values below the threshold value Th to 0 and directly outputting all other values without threshold conversion results in waveform F. If waveform E is a two-level significance signal and waveform F is a multilevel significance signal, the visually non-significant significance signal components can be removed.

Minor noise components can thus be removed from the decoded significance signal by means of this threshold process.

Embodiment 7

Figure 18:
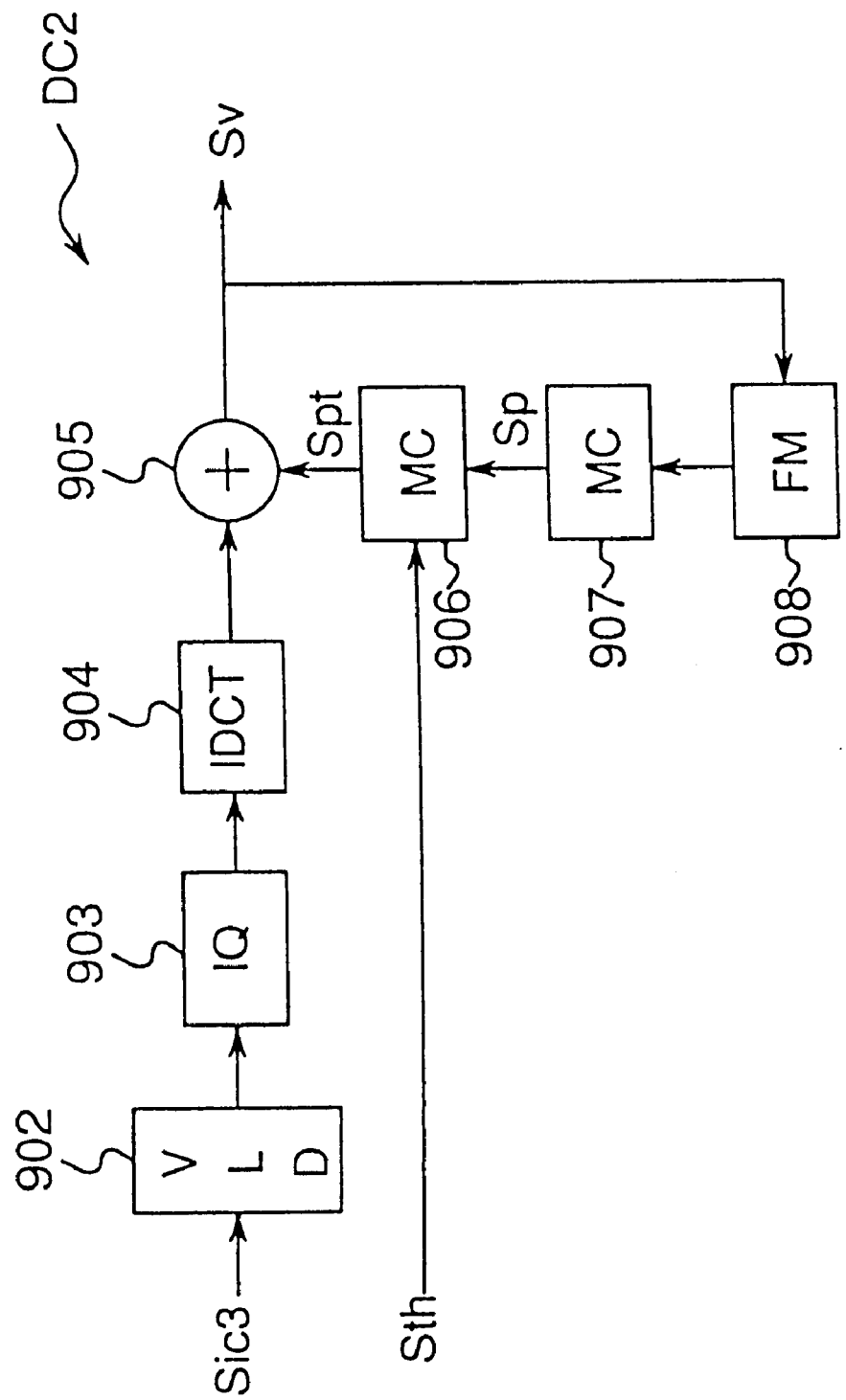
FIG. 18 is a block diagram of an image decoding apparatus according to a seventh embodiment of the invention.

An image decoding apparatus DC2 according to the seventh embodiment of the invention is described next with reference to FIG. 18, a block diagram thereof. Note that this image decoding apparatus DC2 is used to decode the encoded image signal Sic3 generated by the image signal encoding apparatus EC5 shown in FIG. 15.

Encoded image signal Sic3 is supplied to the variable length decoder (VLD) 902 for variable length decoding.

A predictive picture signal Sp is then generated by motion compensator (MC) 907 and supplied to the threshold processor 906. The significance signal of the predictive picture signal Sp generated by motion compensator 907 is then processed by the threshold processor 906, converting all values equal to or below the threshold value Th to non-significant values and generating predictive picture signal Spt. The signal decoded by the variable length decoder (VLD) 902 is inputted to the dequantizer (IQ) 903 for dequantization, and the IDCT is then obtained from the dequantized signal by the orthogonal conversion inverter (IDCT) 904.

The IDCT from the orthogonal conversion inverter (IDCT) 904 is then added by the adder 905 with the pel values generated by the threshold processor (Th) 906 to obtain the decoded image. The decoded image is then stored to the frame memory (FM) 908.

The image decoding apparatus of the present embodiment can thus correctly decode the input signal Sv to obtain an efficiently decoded output signal Sic3.

Embodiment 8

Figure 19:
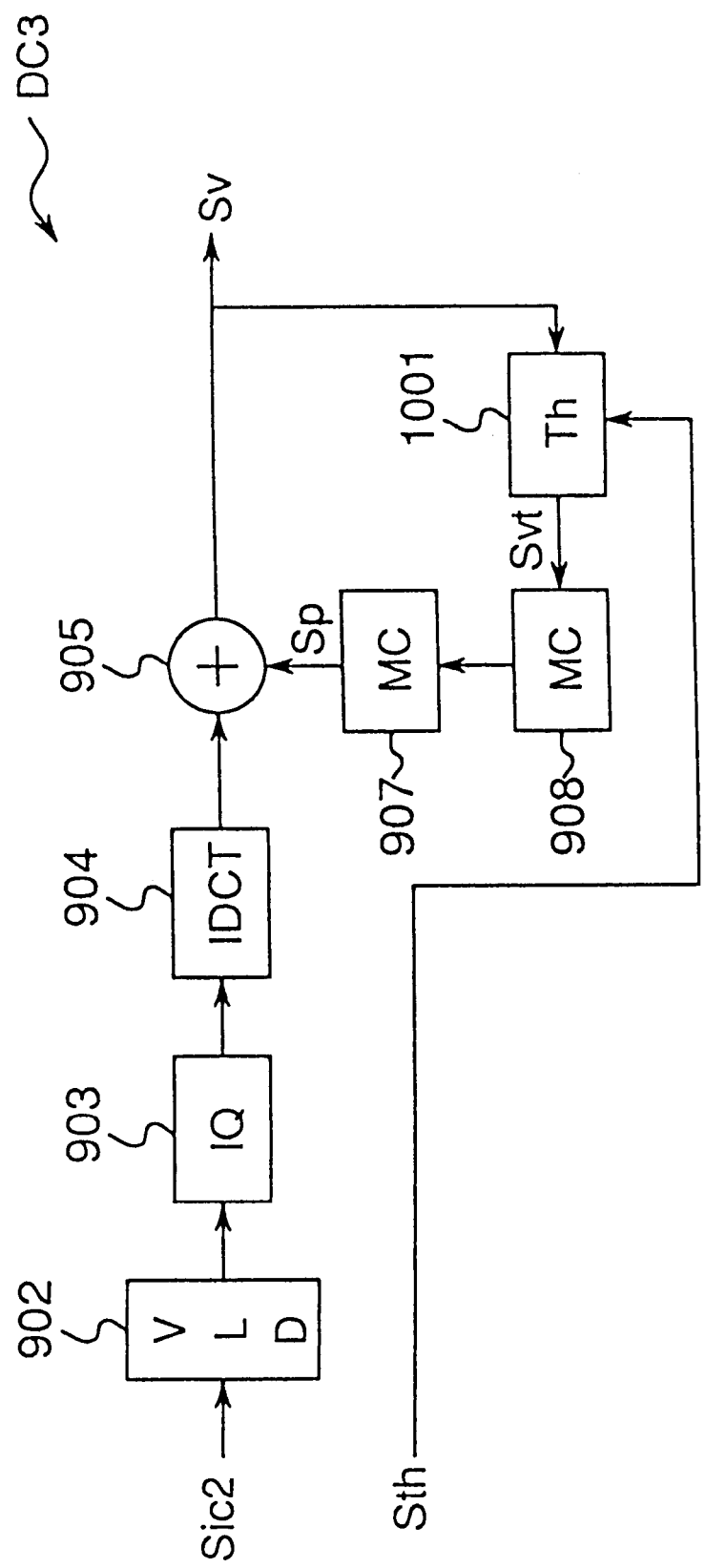
FIG. 19 is a block diagram of an eighth embodiment of an image decoding apparatus according to the invention.

An image decoding apparatus DC3 according to the eighth embodiment of the invention is described next with reference to FIG. 19, a block diagram thereof. Note that this image decoding apparatus DC3 is used to decode the encoded image signal Sic2 generated by the image signal encoding apparatus EC4 shown in FIG. 14.

Encoded image signal Sic2 is supplied to the variable length decoder (VLD) 902 for variable length decoding.

The signal decoded by the variable length decoder (VLD) 902 is inputted to the dequantizer (IQ) 903 for dequantization, and the IDCT is then obtained from the dequantized signal by the orthogonal conversion inverter (IDCT) 904. The output from the frame memory (FM) 908 is also inputted to the motion compensator (MC) 907 to generate a predictive picture signal Sp.

The predictive image generated by motion compensator (MC) 907 is then added by the adder 905 with the IDCT from the orthogonal conversion inverter (IDCT) 904 and outputted as the image signal Sv. The image signal Sv is also fed back to the threshold processor (Th) 1001, thereby converting all decoded image values equal to or below the threshold value Th to non-significant values. The threshold processor (Th) 1001 output is also stored to the frame memory (FM) 908 as decoded image Svt.

If the output signal from the orthogonal conversion inverter (IDCT) 904 is inputted directly to the frame memory (FM) 908, visually non-significant significance signal values and minor noise components contained in the output from the frame memory (FM) 908 will also be motion compensated, and the motion compensation precision therefore drops. The output of the frame memory (FM) 908 is therefore inputted to the motion compensator (MC) 907 for motion compensation and predictive picture signal Sp generation.

The predictive picture signal Sp generated by the motion compensator (MC) 907 is thus added by adder 905 with the output from the orthogonal conversion inverter (IDCT) 904, and simultaneously outputted as image signal Sv and stored to the frame memory (FM) 908 as the decoded image Svt.

It is therefore possible to correctly decode input signal Sic and obtain output image signal Sv by preventing motion compensation from being applied to the visually non-significant significance signal values and minor noise components.

Embodiment 9

Figure 20:
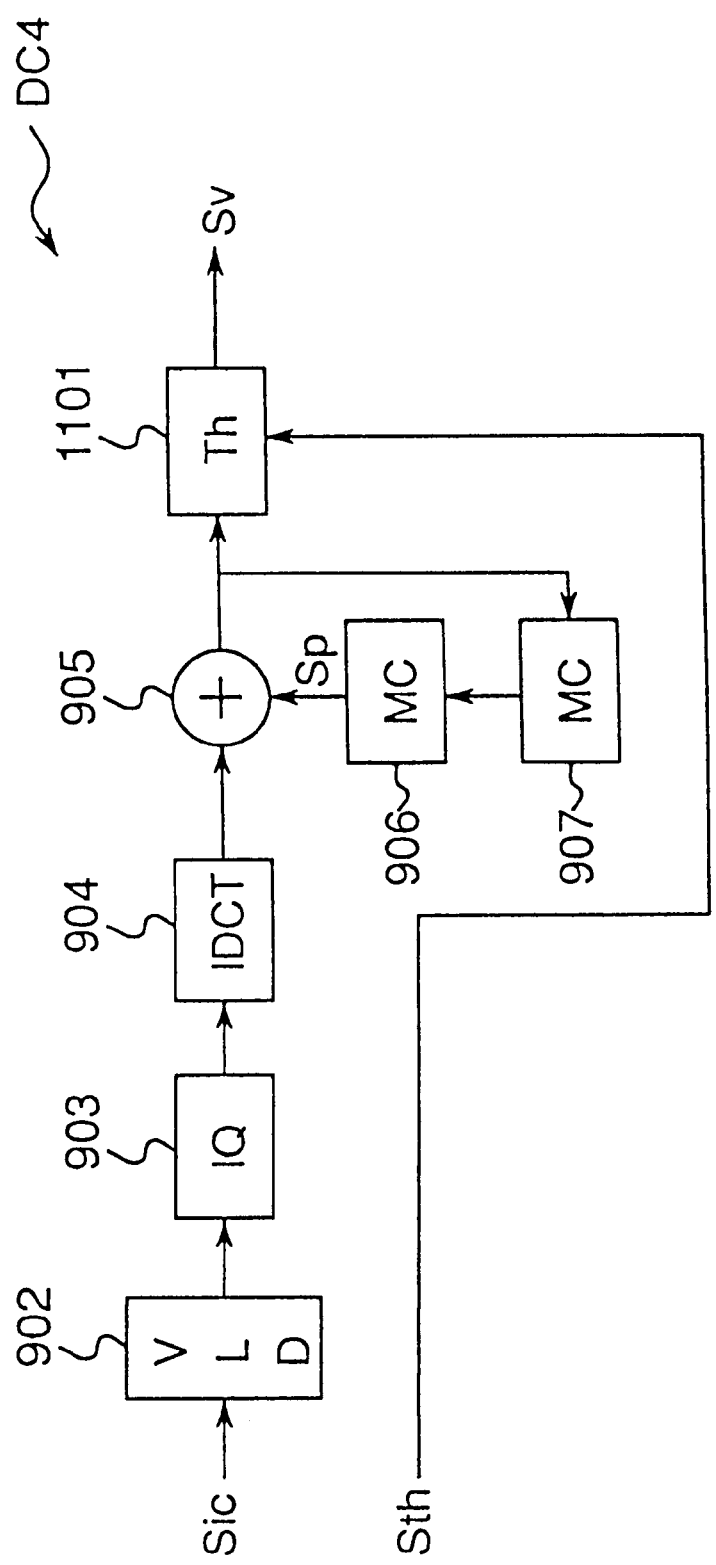
FIG. 20 is a block diagram of a ninth embodiment of an image decoding apparatus according to the invention.

An image decoding apparatus DC4 according to the ninth embodiment of the invention is described next with reference to FIG. 20, a block diagram thereof.

A motion compensation encoded input signal Sic is supplied to the variable length decoder (VLD) 902 for variable length decoding.

The signal decoded by the variable length decoder (VLD) 902 is inputted to the dequantizer (IQ) 903 for dequantization, and the IDCT is then obtained from the dequantized signal by the orthogonal conversion inverter (IDCT) 904.

The IDCT output from the orthogonal conversion inverter (IDCT) 904 is then added by adder 905 to the pel values generated by the motion compensator (MC) 906, and the resulting sum signal is stored as the decoded image to the frame memory (FM) 907. The significance signal of the decoded image outputted by the adder 905 also contains visually non-significant significance signal values, and is therefore processed by the threshold processor (Th) 1101 to convert values equal to or below the threshold value Sth to non-significant values.

It is therefore possible to correctly decode input signal Sic and obtain output image signal Sv. In addition, unlike with the threshold value processes shown in FIG. 18 and FIG. 19, it is possible to control the significance signals having a slight visual effect by varying the value of the threshold value Sth independently of the encoder. It is therefore possible to control the quality of the displayed image.

As described above, the precision of the image conversion process can be improved by means of the image conversion apparatus of the invention because it is possible to separate significant pels from non-significant pels having no pel value.

In addition, by using the image coding apparatus and image decoding apparatus of the invention, the value of pels having no significant effect on the image quality of the reproduced image can be converted to a value whereby the coding efficiency is improved, and the image can be encoded more efficiently. By thus improving the coding efficiency, the practical utility of the invention is great.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims.

What is claimed is:

1. An image signal converting apparatus for converting a significance signal based on the significance signal where the significance signal comprises significance elements expressing a significance value of each of two or more proximal pels comprising an image signal, said image signal converting apparatus comprising:

a resolution conversion characteristics selector for selecting a resolution conversion characteristic based on the significance value of a pel being processed and the pels proximal to the pel being processed; and a resolution converter for converting a resolution of the significance signal by applying the resolution conversion characteristic selected by said resolution conversion characteristic selector;

wherein the resolution conversion of an image is performed using the significant pels within an arbitrary object shape; and wherein the resolution conversion of the image is performed using the significant pels by referring to the significant signal values for the pels proximal to the pel being processed, and wherein the significance signal is different from luminance signals representing the pel values, thus the resolution conversion is performed by referring to significance information indicating whether the target pel is positioned within or outside the arbitrary object shape.

2. An image signal converting method for converting a significance signal based on the significance signal where the significance signal comprises significance elements expressing a significance value of each of two or more proximal pels composing an image signal, said image signal converting method comprising:

selecting a resolution conversion characteristic based on the significance value of a pel being processed and the pels proximal to the pel being processed; and converting a resolution of the significance signal by applying the resolution conversion characteristic selected by said selecting;

wherein the resolution conversion of an image is performed using the significant pels within an arbitrary object shape; and wherein the resolution conversion of the image is performed using the significant pels by referring to the significant signal values for the pels proximal to the pel being processed, and wherein the significance signal is different from luminance signals representing the pel values, thus the resolution conversion is performed by referring to significance information indicating whether the target pel is positioned within or outside the arbitrary object shape.

3. An image signal converting apparatus according to claim 1, wherein said resolution converter is characterized by subsampling the pels of the image signal.

4. An image signal converting apparatus according to claim 1, wherein said resolution converter is characterized by interpolating the pels of the image signal.

5. An image signal converting apparatus according to claim 1, wherein said resolution converter is characterized by generating the significance elements of the significance signal.

6. An image signal converting apparatus according to claim 1, further comprising a second resolution converter disposed upstream of said resolution conversion characteristics selector for resolution converting the significance signal to generate a resolution-converted significance signal, and inputting the resolution-converted significance signal to said resolution conversion characteristics selector in place of the significance signal.

7. An image signal converting method according to claim 2, wherein said converting is characterized by subsampling the pels of the image signal.

8. An image signal converting method according to claim 2, wherein said converting is characterized by interpolating the pels of the image signal.

9. An image signal converting method according to claim 2, wherein said converting is characterized by generating the significance elements of the significance signal.

10. An image signal converting method according to claim 2, further comprising resolution converting the significance signal to generate a resolution-converted significance signal, and using the resolution-converted significance signal in place of the significance signal during said selecting.

11. An image signal converting apparatus for converting a significance signal based on the significance signal where the significance signal comprises significance elements expressing a significance value of each of two or more proximal pels comprising an image signal, said image signal converting apparatus comprising:

a resolution conversion characteristics selector operable to select a resolution conversion characteristic based on the significance value of a pel being processed and the pels proximal to the pel being processed; and a resolution converter operable to convert a resolution of the significance signal by applying the resolution conversion characteristic selected by said resolution conversion characteristic selector;

wherein the resolution conversion of an image is performed using the significant pels within an arbitrary object shape; and wherein the resolution conversion of the image is performed using the significant pels by referring to the significant signal values for the pels proximal to the pel being processed, and wherein the significance signal is different from luminance signals representing the pel values, thus the resolution conversion is performed by referring to significance information which indicates whether the target pel is positioned within or outside the arbitrary object shape.

12. An image signal converting apparatus according to claim 11, wherein said resolution converter is operable to subsample the pels of the image signal.

13. An image signal converting apparatus according to claim 11, wherein said resolution converter is operable to interpolate the pels of the image signal.

14. An image signal converting apparatus according to claim 11, wherein said resolution converter is operable to generate the significance elements of the significance signal.

15. An image signal converting apparatus according to claim 11, further comprising a second resolution converter disposed upstream of said resolution conversion characteristics selector and operable to resolution convert the significance signal to generate a resolution-converted significance signal and to input the resolution-converted significance signal to said resolution conversion characteristics selector in place of the significance signal.

* * * * *

UNITED STATES PATENT AND TRADEMARK OFFICE
CERTIFICATE OF CORRECTION

PATENT NO. : 6,292,513 B1
DATED : September 18, 2001
INVENTOR(S) : Jun Takahashi et al.

It is certified that error appears in the above-identified patent and that said Letters Patent is hereby corrected as shown below:

Column 5,
Line 3, change "input" to -- inputted --.
Line 15, insert -- , -- after "value".

Column 8,
Line 18, in the formula, change "*ak*" to -- α*k* --.
Line 20, in the formula, change "*ak*" to -- α*k* --. (both occurrences)
Line 62, change ":" to -- . --.

Column 11,
Line 4, change ";" to -- , wherein --.
Line 15, change "Y1 = (X1 + X2)/2Y2 = X2" to -- Y1 = (X1 + X2)/2 --.
Line 16, insert -- Y2=X2 --.

Signed and Sealed this

Ninth Day of April, 2002

Attest:

JAMES E. ROGAN
*Attesting Officer*  *Director of the United States Patent and Trademark Office*